(12) United States Patent
Hayamizu et al.

(10) Patent No.: US 11,142,192 B2
(45) Date of Patent: Oct. 12, 2021

(54) IMAGING DEVICE, SIGNAL PROCESSING DEVICE, AND VEHICLE CONTROL SYSTEM

(71) Applicant: SONY CORPORATION, Tokyo (JP)

(72) Inventors: Shinnosuke Hayamizu, Kanagawa (JP); Kazuyuki Marukawa, Kanagawa (JP); Itaru Shimizu, Tokyo (JP); Noriko Tanaka, Tokyo (JP); Asako Kaneko, Tokyo (JP)

(73) Assignee: SONY CORPORATION, Tokyo (JP)

( * ) Notice: Subject to any disclaimer, the term of this patent is extended or adjusted under 35 U.S.C. 154(b) by 166 days.

(21) Appl. No.: 16/327,011

(22) PCT Filed: Sep. 1, 2017

(86) PCT No.: PCT/JP2017/031588
§ 371 (c)(1),
(2) Date: Feb. 21, 2019

(87) PCT Pub. No.: WO2018/051816
PCT Pub. Date: Mar. 22, 2018

(65) Prior Publication Data
US 2019/0202451 A1 Jul. 4, 2019

(30) Foreign Application Priority Data

Sep. 15, 2016 (JP) ............................. JP2016-180208

(51) Int. Cl.
*B60W 30/09* (2012.01)
*B60W 50/14* (2020.01)
(Continued)

(52) U.S. Cl.
CPC ............ *B60W 30/09* (2013.01); *B60R 11/02* (2013.01); *B60R 21/00* (2013.01); *B60W 10/04* (2013.01);
(Continued)

(58) Field of Classification Search
CPC ...... B60W 30/00; B60W 30/08; B60W 30/09; B60W 30/14; B60W 30/0956;
(Continued)

(56) References Cited

U.S. PATENT DOCUMENTS

| 7,102,496 | B1 * | 9/2006 | Ernst, Jr. .......... G08G 1/096725 180/167 |
| 2007/0003108 | A1 * | 1/2007 | Chinomi ................ G03B 37/06 382/104 |

(Continued)

FOREIGN PATENT DOCUMENTS

| CN | 101287626 A | 10/2008 |
| CN | 102555907 A | 7/2012 |

(Continued)

OTHER PUBLICATIONS

JP2009237898_Description_English Translation: pp. 1-7, generated by Espacenet—Patent Translate on Feb. 1, 2021 (Year: 2021).*

(Continued)

*Primary Examiner* — Geepy Pe
*Assistant Examiner* — Michael Allen Brace, Jr.
(74) *Attorney, Agent, or Firm* — Chip Law Group

(57) ABSTRACT

The present technology relates to an imaging device, a signal processing device, and a vehicle control system enabling proper driving support when a vehicle enters a road from the outside of the road. An imaging device includes: an imaging unit that captures an image of a front of a vehicle; and an object detection unit that performs object detection processing on the basis of the image captured by the imaging unit, wherein the object detection unit changes an object detection method on the basis of a positional relationship between the vehicle and a road where the vehicle enters from an outside.

(Continued)

The present technology can be applied to an imaging device installed in, for example, various vehicles that perform driving support.

16 Claims, 18 Drawing Sheets

(51) Int. Cl.
| | |
|---|---|
| *B60W 10/04* | (2006.01) |
| *B60W 10/18* | (2012.01) |
| *B60W 10/20* | (2006.01) |
| *B60W 40/04* | (2006.01) |
| *B60W 30/14* | (2006.01) |
| *G06K 9/00* | (2006.01) |
| *B60R 21/00* | (2006.01) |
| *B60R 11/02* | (2006.01) |
| *B60W 30/08* | (2012.01) |
| *G08G 1/16* | (2006.01) |
| *G06T 7/70* | (2017.01) |

(52) U.S. Cl.
CPC ............ *B60W 10/18* (2013.01); *B60W 10/20* (2013.01); *B60W 30/08* (2013.01); *B60W 30/14* (2013.01); *B60W 40/04* (2013.01); *B60W 50/14* (2013.01); *G06K 9/00805* (2013.01); *G06T 7/70* (2017.01); *G08G 1/16* (2013.01); *G08G 1/166* (2013.01); *B60W 2050/146* (2013.01); *G06T 2207/30261* (2013.01)

(58) Field of Classification Search
CPC ...... B60W 40/00; B60W 40/02; B60W 40/04; B60W 50/00; B60W 50/14; B60W 2050/046; B60W 2050/146; B60W 2050/0077; B60W 2050/0079; B60W 10/00; B60W 10/04; B60W 10/18; B60W 10/20; G06T 7/00; G06T 7/73; G06T 7/74; G06T 7/75; G06T 7/77; G06T 2207/30236; G06T 2207/30252; G06T 2207/30256; G06T 2207/30261; G08G 1/16; G08G 1/164; G08G 1/166
See application file for complete search history.

(56) References Cited

U.S. PATENT DOCUMENTS

| | | | | |
|---|---|---|---|---|
| 2007/0010938 | A1* | 1/2007 | Kubota | G08G 1/165 701/532 |
| 2008/0143833 | A1* | 6/2008 | Yanai | B60R 1/00 348/148 |
| 2008/0243390 | A1* | 10/2008 | Nakamori | G06K 9/00805 701/301 |
| 2012/0140072 | A1* | 6/2012 | Murashita | G06K 9/00805 348/148 |
| 2015/0103159 | A1* | 4/2015 | Shashua | G06K 9/00791 348/118 |
| 2015/0175072 | A1* | 6/2015 | Sabeti | G08G 1/166 348/148 |
| 2016/0014406 | A1* | 1/2016 | Takahashi | G06T 7/246 348/148 |
| 2016/0063710 | A1* | 3/2016 | Tanaka | G06K 9/00805 382/103 |
| 2016/0137199 | A1* | 5/2016 | Kuhne | B60W 30/09 701/41 |
| 2016/0163217 | A1* | 6/2016 | Harkness | G09B 9/052 434/65 |
| 2016/0180158 | A1* | 6/2016 | Gupta | G06K 9/00805 348/148 |
| 2017/0329332 | A1* | 11/2017 | Pilarski | B60W 30/0956 |
| 2017/0341652 | A1* | 11/2017 | Sugawara | B60W 30/095 |

FOREIGN PATENT DOCUMENTS

| | | |
|---|---|---|
| DE | 102006000326 A1 | 1/2007 |
| EP | 1824702 A2 | 8/2007 |
| JP | 2006-180446 A | 7/2006 |
| JP | 2007-017340 A | 1/2007 |
| JP | 2009237898 A * | 10/2009 |
| JP | 2009271766 A * | 11/2009 |
| JP | 2010-210477 A | 9/2010 |
| JP | 2012-123470 A | 6/2012 |
| JP | 2013-164688 A | 8/2013 |
| JP | 2015-125560 A | 7/2015 |
| JP | 5812598 B2 | 11/2015 |
| WO | 2006/056862 A2 | 6/2006 |

OTHER PUBLICATIONS

JP2009271766A_Description_English_Translation; translation provided by Espacenet: Patent Translate on Jun. 3, 2021; pp. 1-29 (Year: 2009).*
International Search Report and Written Opinion of PCT Application No. PCT/JP2017/031588, dated Nov. 28, 2017, 11 pages of ISRWO.
Extended European Search Report of EP Application No. 17850719. 0, dated Aug. 28, 2019, 06 pages.

* cited by examiner

IMAGING DEVICE, SIGNAL PROCESSING DEVICE, AND VEHICLE CONTROL SYSTEM

CROSS REFERENCE TO RELATED APPLICATIONS

This application is a U.S. National Phase of International Patent Application No. PCT/JP2017/031588 filed on Sep. 1, 2017, which claims priority benefit of Japanese Patent Application No. JP 2016-180208 filed in the Japan Patent Office on Sep. 15, 2016. Each of the above-referenced applications is hereby incorporated herein by reference in its entirety.

TECHNICAL FIELD

The present technology relates to an imaging device, a signal processing device, and a vehicle control system and, in particular, to an imaging device, a signal processing device, and a vehicle control system preferably used to perform driving support when a vehicle enters a road from the outside of the road.

BACKGROUND ART

Conventionally, there has been proposed a technology for making a diagnosis of driving from time at which a vehicle approaches an intersection to time at which the vehicle passes through the intersection and outputting, when it is determined that the driving at the intersection is risky, a voice message while displaying the direction of a risky object after the vehicle passes through the intersection (see, for example, Patent Literature 1).

CITATION LIST

Patent Literature

Patent Literature 1: Japanese Patent Application Laid-open No. 2015-125560

DISCLOSURE OF INVENTION

Technical Problem

However, the technology described in Patent Literature 1 does not assume a case in which a vehicle enters a road from the outside of the road.

The present technology has been made in view of the above circumstances and enables proper driving support when a vehicle enters a road from the outside of the road.

Solution to Problem

An imaging device according to a first aspect of the present technology includes: an imaging unit that captures an image of a front of a vehicle; and an object detection unit that performs object detection processing on the basis of the image captured by the imaging unit, wherein the object detection unit changes an object detection method on the basis of a positional relationship between the vehicle and a road where the vehicle enters from an outside.

The object detection unit can change at least one of a preferential detection range in which an object is preferentially detected or a preferential detection target that is preferentially detected on the basis of the positional relationship between the vehicle and the road.

The object detection unit can perform at least one of detection processing in which the roadway is detected as the preferential detection range or detection processing in which another vehicle is detected as the preferential detection target before the vehicle enters a roadway inside the road.

When the vehicle merges with a first lane inside the roadway, the object detection unit can preferentially perform detection processing to detect another vehicle approaching a position at which the vehicle merges in the first lane before the vehicle enters the roadway.

When the vehicle crosses a second lane inside the roadway before merging with the first lane, the object detection unit can further preferentially perform detection processing to detect another vehicle approaching a position at which the vehicle crosses in the second lane before the vehicle enters the roadway.

The object detection unit can preferentially perform detection processing to detect a situation of a merging destination at which the vehicle merges with the roadway when no obstacle is detected on the roadway.

The object detection unit can perform at least one of detection processing in which a sidewalk is detected as the preferential detection range or detection processing in which a pedestrian is detected as the preferential detection target before the vehicle enters the sidewalk inside the road.

The imaging unit can include a plurality of cameras each having a different imaging range, and the object detection unit can switch between the cameras preferentially used for the object detection processing on the basis of the positional relationship between the vehicle and the road.

The object detection unit can change the object detection method on the basis of a distance between the vehicle and the road.

A signal processing device according to a second aspect of the present technology includes: an object detection unit that performs object detection processing on the basis of an image obtained by capturing a front of a vehicle, wherein the object detection unit changes an object detection method on the basis of a positional relationship between the vehicle and a road where the vehicle enters from an outside.

A vehicle control system according to a third aspect of the present technology includes: an imaging unit that captures an image of a front of a vehicle; an object detection unit that performs object detection processing on the basis of the image captured by the imaging unit; and a vehicle control unit that controls the vehicle on the basis of an object detection result of the object detection unit, wherein the object detection unit changes an object detection method on the basis of a positional relationship between the vehicle and a road where the vehicle enters from an outside.

The object detection unit can change at least one of a preferential detection range in which an object is preferentially detected or a preferential detection target that is preferentially detected on the basis of the positional relationship between the vehicle and the road.

The object detection unit can perform at least one of detection processing in which the roadway is detected as the preferential detection range or detection processing in which another vehicle is detected as the preferential detection target before the vehicle enters a roadway inside the road, and the vehicle control unit can control the vehicle to perform at least one of prohibition of entrance of the vehicle into the roadway or issuance of an alert to a driver when an obstacle is detected on the roadway.

The vehicle control unit can control the vehicle to show guidance for causing the vehicle to merge with the roadway when no obstacle is detected on the roadway.

The vehicle control unit can change content of the guidance on the basis of a driving skill of the driver.

The object detection unit can preferentially perform detection processing to detect a situation of a merging destination at which the vehicle merges with the roadway when no obstacle is detected on the roadway, and the vehicle control unit can control the vehicle to perform at least one of control of traveling of the vehicle or the issuance of the alert to the driver on the basis of the situation of the merging destination.

The object detection unit can perform at least one of detection processing in which a sidewalk is detected as the preferential detection range or detection processing in which a pedestrian is detected as the preferential detection target before the vehicle enters the sidewalk inside the road, and the vehicle control unit can control the vehicle to perform at least one of prohibition of entrance of the vehicle into the sidewalk or issuance of an alert to a driver when an obstacle is detected on the sidewalk.

The imaging unit can include a plurality of cameras each having a different imaging range, and the object detection unit can switch between the cameras preferentially used for the object detection processing on the basis of the positional relationship between the vehicle and the road.

The vehicle control system can further include: a plurality of object detection sensors each having a different detection range, and the object detection unit can further perform the object detection processing on the basis of sensor data from the plurality of object detection sensors, and switch between the object detection sensors preferentially used for the object detection processing on the basis of the positional relationship between the vehicle and the road.

The object detection unit can change the object detection method on the basis of a distance between the vehicle and the road.

In the first aspect of the present technology, an image of the front of a vehicle is captured, object detection processing is performed on the basis of the captured image, and an object detection method is changed on the basis of the positional relationship between the vehicle and a road where the vehicle enters from an outside.

In the second aspect of the present technology, object detection processing is performed on the basis of a captured image of the front of a vehicle, and an object detection method is changed on the basis of the positional relationship between the vehicle and a road where the vehicle enters from an outside.

In the third aspect of the present technology, an image of the front of a vehicle is captured, object detection processing is performed on the basis of the captured image, the vehicle is controlled on the basis of an object detection result, and an object detection method is changed on the basis of the positional relationship between the vehicle and a road where the vehicle enters from an outside.

Advantageous Effects of Invention

According to the first and second aspects of the present technology, an object in front of a vehicle can be detected. Particularly, according to the first and second aspects of the present technology, an object in front of a vehicle can be detected on the basis of a different detection method corresponding to the positional relationship between the vehicle and a road when the vehicle enters the road from the outside of the road. As a result, driving support can be properly performed.

According to the third aspect of the present technology, a vehicle can be controlled on the basis of a detection result of an object in front of a vehicle. Particularly, according to the third aspect of the present technology, an object in front of a vehicle can be detected on the basis of a different detection method corresponding to the positional relationship between the vehicle and a road when the vehicle enters the road from the outside of the road. As a result, driving support can be properly performed.

Note that the above effects are not necessarily restrictive but any effect described in the present discloser may be produced.

MODE(S) FOR CARRYING OUT THE INVENTION

Hereinafter, a description will be given of an embodiment for carrying out the present technology. The description will be given in the following order.

1. Embodiment
2. Modified Example
3. Other

Note that the present technology aims to realize, for example, proper driving support when a vehicle enters and merges a road from the outside of the road. Here, the driving support represents traveling control performed when the vehicle is driven under any driving mode such as assist driving and self-driving. Hereinafter, a case in which driving support processing is appropriately performed when a vehicle to which the present technology is applied performs assist driving will be described as an example.

1. Embodiment

1-1. Configuration Example of Vehicle

Figure 1:
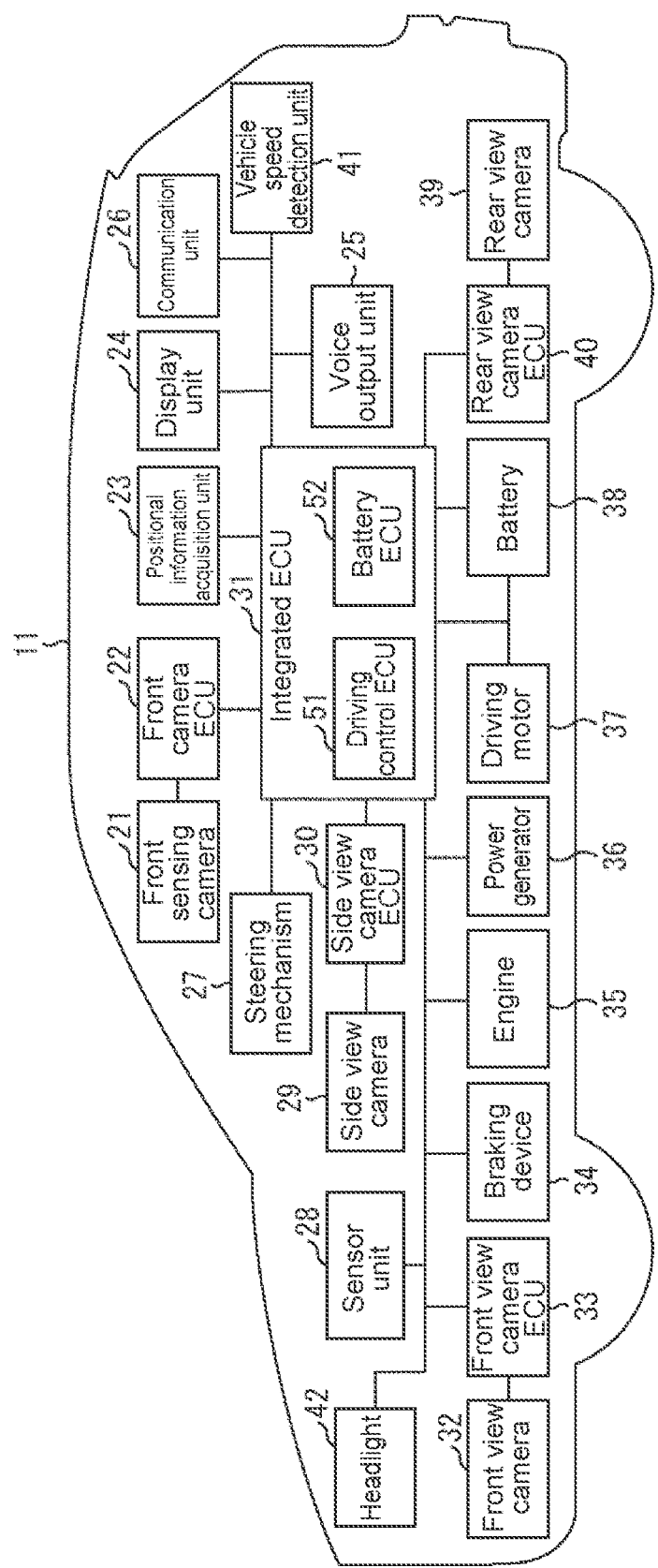
FIG. 1 is a diagram showing a configuration example of a vehicle.

FIG. 1 is a diagram showing a configuration example of an embodiment of a vehicle to which the present technology is applied.

A vehicle 11 shown in FIG. 1 has a front sensing camera 21, a front camera ECU (Electronic Control Unit) 22, a positional information acquisition unit 23, a display unit 24, a voice output unit 25, a communication unit 26, a steering mechanism 27, a sensor unit 28, side view cameras 29, side view camera ECUs 30, an integrated ECU 31, a front view camera 32, a front view camera ECU 33, a braking device 34, an engine 35, a power generator 36, a driving motor 37, a battery 38, a rear view camera 39, a rear view camera ECU 40, a vehicle speed detection unit 41, and a headlight 42.

The respective units provided in the vehicle 11 are connected to one another via a CAN (Controller Area Network) communication bus, other connection lines, and the like. Here, however, the bus, other connection lines, and the like are drawn without being distinguished from each other for facilitating the visualization of the figure.

The front sensing camera 21 is constituted by, for example, a sensing-specific camera arranged near a rearview mirror inside the vehicle, captures an image of the front of the vehicle 11 as a subject, and outputs a resulting sensing image to the front camera ECU 22.

Note that it is also possible to provide a plurality of the front sensing cameras 21 as will be described later with reference to FIGS. 5 to 7.

The front camera ECU 22 performs image recognition on a sensing image to detect any object such as a road boundary line and a pedestrian from a sensing image after appropriately applying processing for improving image quality or the like to the sensing image supplied from the front sensing camera 21. The front camera ECU 22 outputs an object detection result to the CAN communication bus.

The positional information acquisition unit 23 is constituted by, for example, a positional information measurement system such as a GPS (Global Positioning System), detects the position of the vehicle 11, and outputs positional information representing a detection result to the CAN communication bus.

The display unit 24 is constituted by, for example, a liquid crystal display panel or the like and arranged at a prescribed position inside the vehicle such as the central portion of an instrument panel and the inside of the rearview mirror. Further, the display unit 24 may be a transmission display or a head-up display provided to be overlapped with a windshield, or may be the display of a car navigation system. Further, a combiner head-up display may be used. The display unit 24 displays various images according to the control of the integrated ECU 31.

The voice output unit 25 is constituted by, for example, a speaker, a buzzer, or the like. The voice output unit 25 outputs various voice according to the control of the integrated ECU 31.

The communication unit 26 performs the transmission and reception of information with a surrounding vehicle, a mobile terminal device possessed by a pedestrian, a roadside machine, and an external server via various wireless communication such as vehicle-to-vehicle communication, vehicle-to-pedestrian communication, and road-to-vehicle communication. The communication unit 26 performs, for example, the vehicle-to-vehicle communication with a surrounding vehicle to receive surrounding vehicle information containing information representing the number of passengers or a traveling state from the surrounding vehicle, and supplies the surrounding vehicle information to the integrated ECU 31.

The steering mechanism 27 performs the control of a traveling direction, that is, the steering angle control of the vehicle 11 according to the operation of a steering wheel by a driver or a control signal supplied from the integrated ECU 31.

The sensor unit 28 includes a plurality of object detection sensors that detect the presence or absence of an object around the vehicle 11, a distance to an object, or the like. The sensor unit 28 includes, for example, a short-distance sensor (such as, for example, a ultrasonic sensor) that detects an object close to the vehicle 11 and a long-distance sensor (such as, for example, a radar sensor, a lidar sensor, and a TOF (Time of Flight) sensor) that detects an object at a distance from the vehicle 11. The respective object detection sensors are different in their detection ranges, detection methods, applications, or the like and used for different purposes. The respective object detection sensors of the sensor unit 28 output sensor data representing their detection results to the CAN communication bus.

The side view cameras 29 are, for example, cameras that are arranged inside the housings of side mirrors or near the side mirrors, capture images (hereinafter also called side images) of the sides of the vehicle 11 containing dead-angle regions for a driver and supply the images to the side view camera ECUs 30.

The side view camera ECUs 30 apply image processing for improving image quality such as white balance control to side images supplied from the side view cameras 29 and supply resulting side images to the integrated ECU 31 via a cable different from the CAN communication bus.

The integrated ECU 31 is constituted by a plurality of ECUs arranged at the center of the vehicle 11 such as a driving control ECU 51 and a battery ECU 52, and controls the operation of the entire vehicle 11.

The driving control ECU 51 is, for example, an ECU that realizes an ADAS (Advanced Driving Assistant System) function or a self-driving function, and controls the driving (traveling) of the vehicle 11 based on an object detection result from the front camera ECU 22, positional information from the positional information acquisition unit 23, various information such as surrounding vehicle information supplied from the communication unit 26, sensor data from the sensor unit 28, a vehicle speed detection result from the vehicle speed detection unit 41, or the like. That is, the driving control ECU 51 controls the steering mechanism 27, the braking device 34, the engine 35, the driving motor 37, or the like to control the driving of the vehicle 11. Further, the driving control ECU 51 controls the headlight 42 based on the presence or absence of the headlight of an oncoming vehicle or the like supplied as an object detection result from the front camera ECU 22 to control the beam irradiation of the headlight 42 such as switching between a high beam and a low beam.

Note that a dedicated ECU may be provided for each of functions such as the ADAS function, the self-driving function, and the beam control in the integrated ECU 31.

The battery ECU 52 controls the supply of power by the battery 38 or the like.

The front view camera 32 is constituted by, for example, a camera that is arranged near a front grille, captures an image (hereinafter also called a front image) of the front of the vehicle 11 containing a dead-angle region for a driver, and supplies the image to the front view camera ECU 33.

The front view camera ECU 33 applies image processing for improving image quality such as white balance control to a front image supplied from the front view camera 32, and supplies a resulting front image to the integrated ECU 31 via a cable different from the CAN communication bus.

The braking device 34 operates according to a braking operation by a driver or a control signal supplied from the integrated ECU 31 and stops or decelerates the vehicle 11.

The engine 35 is the power source of the vehicle 11 and drives according to a control signal supplied from the integrated ECU 31.

The power generator 36 is controlled by the integrated ECU 31 and generates power according to the driving of the engine 35.

The driving motor 37 is the power source of the vehicle 11, receives the supply of power from the power generator 36 or the battery 38, and drives according to a control signal supplied from the integrated ECU 31. Note that the switching between the driving of the engine 35 and the driving of the driving motor 37 during the traveling of the vehicle 11 is appropriately performed by the integrated ECU 31.

The battery 38 has, for example, a 12 V battery, a 200 V battery, or the like and supplies power to the respective units of the vehicle 11 according to the control of the battery ECU 52.

The rear view camera 39 is constituted by, for example, a camera that is arranged near a number plate at a tail gate, captures an image (hereinafter also called a rear image) of the rear of the vehicle 11 containing a dead-angle region for a driver, and supplies the image to the rear view camera ECU 40. The rear view camera 39 starts, for example, when a shift lever not shown is moved to a reverse (R) position.

The rear view camera ECU 40 applies image processing for improving image quality such as white balance control to a rear image supplied from the rear view camera 39 and supplies a resulting rear image to the integrated ECU 31 via a cable different from the CAN communication bus.

The vehicle speed detection unit 41 is a sensor that detects the vehicle speed of the vehicle 11 and supplies a vehicle speed detection result to the integrated ECU 31. Note that acceleration or the differential (jerk) of the acceleration may be calculated from a vehicle speed detection result. The calculated acceleration is used to perform, for example, the estimation of time until the vehicle 11 collides with an object, or the like. The calculated jerk is used as a parameter about a comfortable ride for a passenger.

The headlight 42 operates according to a control signal supplied from the integrated ECU 31 and outputs a beam to illuminate the front of the vehicle 11.

Figure 2:
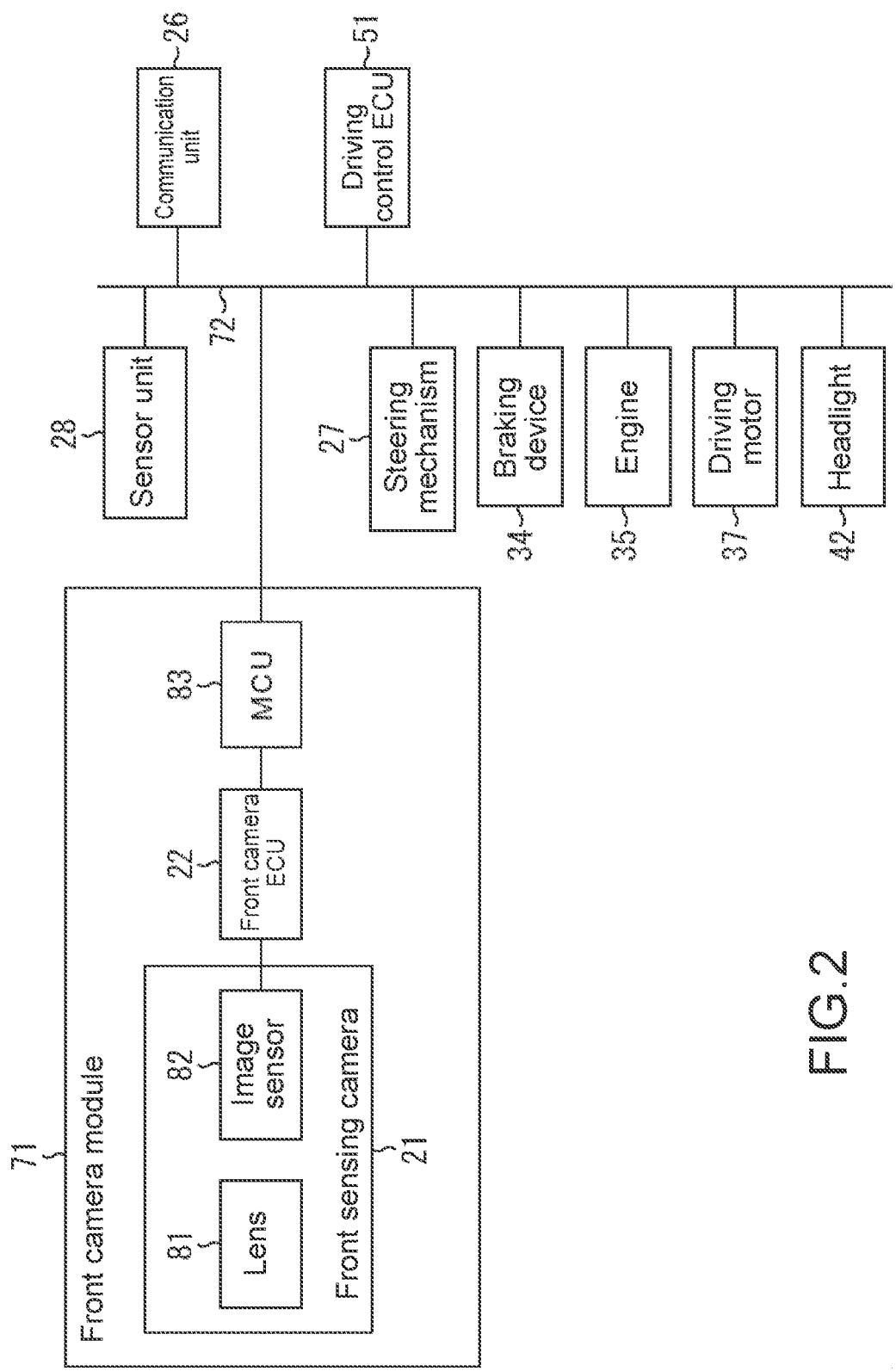
FIG. 2 is a diagram for describing blocks connected to a CAN communication bus.

Further, as shown in FIG. 2, a plurality of units including a front camera module 71, the communication unit 26, the driving control ECU 51, the steering mechanism 27, the sensor unit 28, the braking device 34, the engine 35, the driving motor 37, and the headlight 42 are connected to one another via a CAN communication bus 72 to constitute a vehicle control system in the vehicle 11. Note that portions shown in FIG. 2 corresponding to the portions shown in FIG. 1 will be denoted by the same symbols and their descriptions will be appropriately omitted.

In this example, the front camera module 71 has a lens 81, an image sensor 82, the front camera ECU 22, and a MCU (Module Control Unit) 83.

Further, the front sensing camera 21 is constituted by the lens 81 and the image sensor 82. The image sensor 82 is constituted by, for example, a CMOS (Complementary Metal Oxide Semiconductor) image sensor or the like.

Note that as will be described later with reference to FIGS. 5 to 7, the provision of a plurality of sets of the lenses 81 and the image sensors 82 makes it also possible to provide a plurality of the front sensing cameras 21 in the front camera module 71.

In the front camera module 71, light from a subject is condensed onto the imaging surface of the image sensor 82 by the lens 81. The image sensor 82 captures a sensing image by photoelectrically converting light incident from the lens 81 and supplies the image to the front camera ECU 22. Note that the color filter of the image sensor 82 may have a Bayer array or an RCCC array in which three clear pixels are arranged with respect to one Red pixel. In the case of the RCCC arrangement, image data specializing in sensing can be obtained.

The front camera ECU 22 performs image recognition on a sensing image after applying image quality control processing such as, for example, gain control, white balance control, HDR (High Dynamic Range) processing, and flicker correction processing for a traffic signal on the sensing image supplied from the image sensor 82. Note that the image quality control processing is not necessarily performed by the front camera ECU 22 but may be performed inside the image sensor 82. When the image quality control processing is performed inside the image sensor 82, the image sensor 82 is desirably a stacked image sensor.

In the image recognition, the detection of any object such as a pedestrian, a lightweight vehicle such as a bicycle, a vehicle, a headlight, a brakelight, a road sign such as a boundary line, a curb, a road shoulder, a guardrail, and a road marker, the detection of time until collision with a front vehicle, or the like is performed. A detection result by the above image recognition is converted into a signal having a format for CAN communication by the MCU 83 and output to the bus 72.

Further, information supplied from the bus 72 is converted into a signal having a format for the front camera module 71 by the MCU 83 and supplied to the front camera ECU 22. Note that the MCU 83 is not limited to a micro control unit but various controllers are applicable.

The driving control ECU 51 appropriately controls the steering mechanism 27, the braking device 34, the engine 35, the driving motor 37, the headlight 42, or the like based on an object detection result output from the MCU 83 to the bus 72, sensor data from the sensor unit 28, or the like. Thus, driving control such as changing a traveling direction, braking, acceleration, and starting, alert notification control, beam switching control, or the like is realized.

Further, when realizing the self-driving function or the like, the driving control ECU 51 may further recognize the track of the position of an object from, for example, an image recognition result at each time acquired by the front camera ECU 22 and transmit the recognition result to an external server via the communication unit 26. In this case, learning such as deep neural network is, for example, performed in the server to generate a necessary dictionary or the like, and the dictionary or the like is transmitted to the vehicle 11. In the vehicle 11, the dictionary or the like thus acquired is received by the communication unit 26, and the received dictionary or the like is used for various predictions or the like in the driving control ECU 51.

In addition, the driving control ECU 51 learns the driving skills, driving tendencies, or the like of a driver based on the records of a driving operation performed by the driver or the like with respect to the vehicle 11.

Note that control capable of being realized only from an image recognition result with respect to a sensing image among the control performed by the driving control ECU 51 may be performed by the front camera ECU 22 rather than being performed by the driving control ECU 51.

Specifically, for example, the front camera ECU 22 may control the headlight 42 based on the presence or absence of the headlight of an oncoming vehicle acquired from image recognition with respect to a sensing image. In this case, for example, the front camera ECU 22 generates a control signal for commanding the switching between a low beam and a high beam or the like and supplies the control signal to the headlight 42 via the MCU 83 and the bus 72 to control beam switching by the headlight 42.

Besides, for example, the front camera ECU 22 may generate an alert notification for notifying a driver of collision with an object, an alert notification for notifying the driver of deviation from a traveling lane, or the like based on a road boundary line, a curb, a pedestrian, or the like acquired by image recognition with respect to a sensing image and output the notification to the bus 72 via the MCU 83 to control an alert notification. In this case, the alert notification output from the front camera ECU 22 is supplied to, for example, the display unit 24, the voice output unit 25, or the like. Thus, the display unit 24 can perform an alert display, or the voice output unit 25 can output an alert message.

Moreover, in the vehicle 11, a synthesized image is displayed on the display unit 24 during, for example, parking or the like to realize an around view monitor function.

Figure 3:
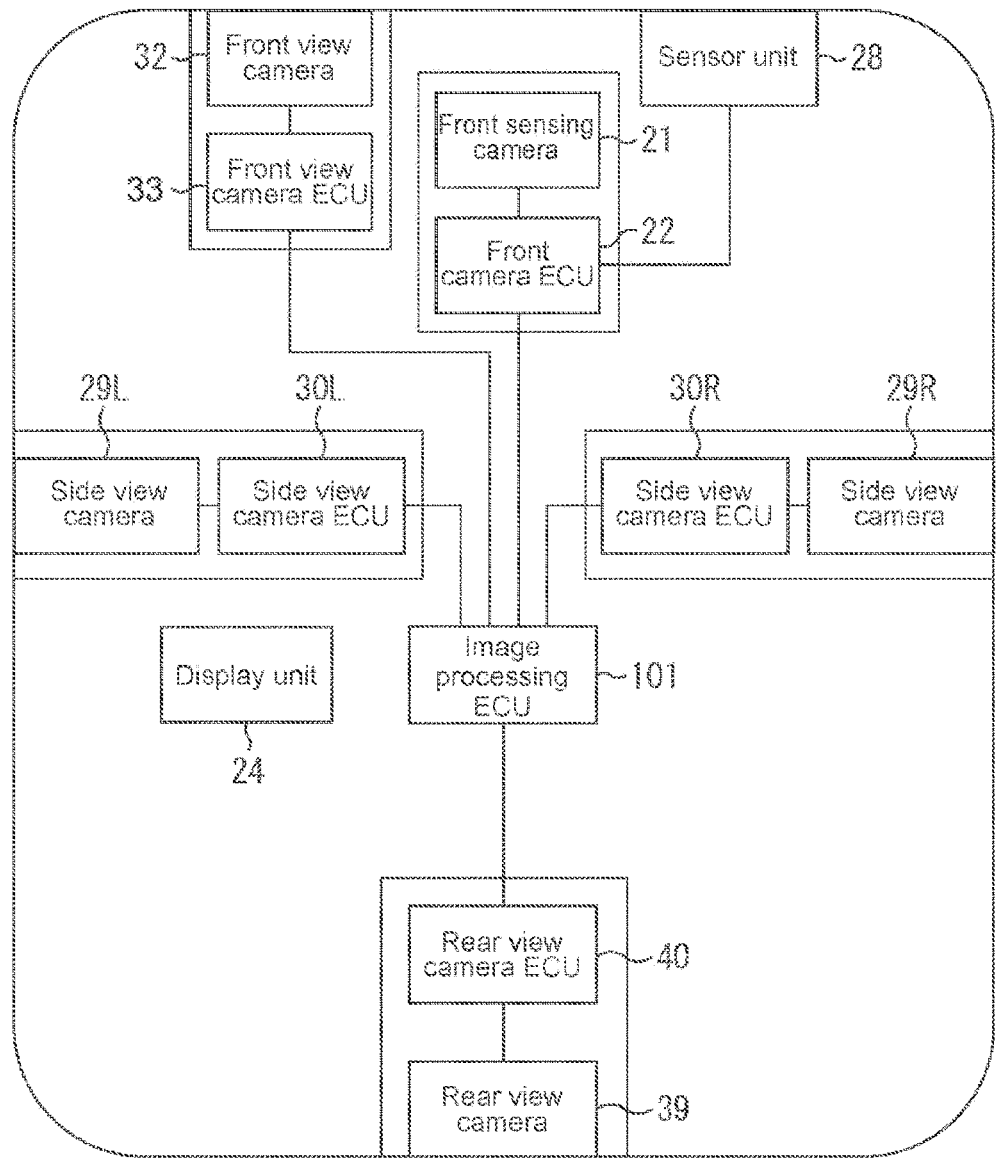
FIG. 3 is a diagram for describing an around view monitor.

That is, as shown in, for example, FIG. 3, a front image, a rear image, and side images acquired by respective units are supplied to an image synthesis ECU 101 provided in the integrated ECU 31 via a cable different from the CAN communication bus, and a synthesized image is generated from the images. Note that portions shown in FIG. 3 corresponding to the portions shown in FIG. 1 are denoted by the same symbols and their descriptions will be appropriately omitted.

In FIG. 3, a side view camera 29L arranged on the left side of the vehicle 11 and a side view camera 29R arranged on the right side of the vehicle 11 are provided as the side view cameras 29 shown in FIG. 1. Further, a side view camera ECU 30L arranged on the left side of the vehicle 11 and a side view camera ECU 30R arranged on the right side of the vehicle 11 are provided as the side view camera ECUs 30.

A front image acquired by the front view camera 32 and a rear image acquired by the rear view camera 39 are supplied from the front view camera ECU 33 and the rear view camera ECU 40, respectively, to the image synthesis ECU 101. Further, a side image (hereinafter also particularly called a left side image) acquired by the side view camera 29L and a side image (hereinafter also particularly called a right side image) acquired by the side view camera 29R are supplied from the side view camera ECU 30L and the side view camera ECU 30R, respectively, to the image synthesis ECU 101.

The image synthesis ECU 101 generates a synthesized image, in which the front image, the rear image, the left side image, and the right side image are arranged at corresponding regions, based on the supplied images and supplies the acquired synthesized image to the display unit 24 to be displayed. A driver can safely and easily park the vehicle 11 by driving the vehicle 11 while confirming the synthesized image thus displayed. Note that the integrated ECU 31 may control the driving of the vehicle 11 based on the synthesized image to park the vehicle 11.

Figure 4:
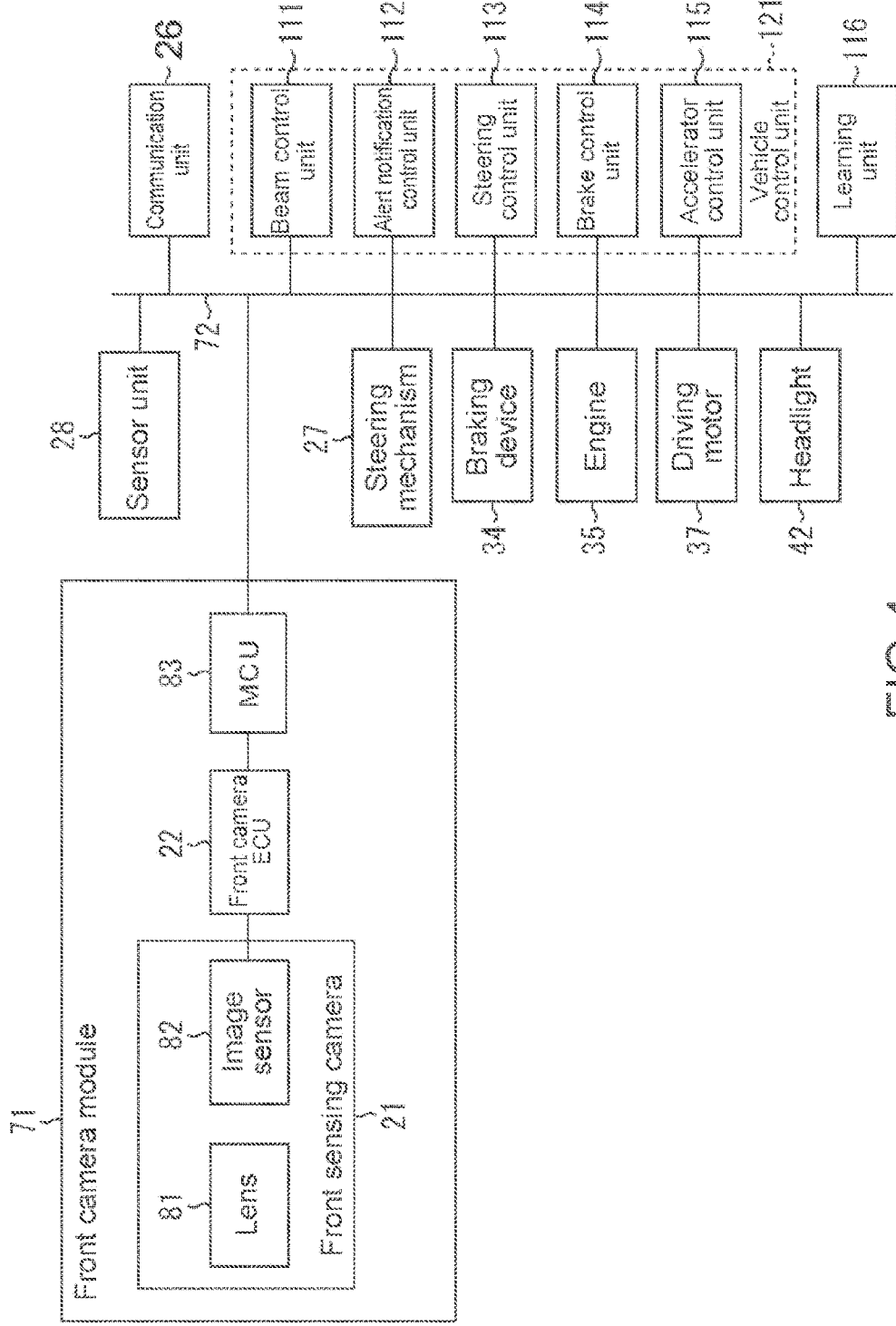
FIG. 4 is a diagram for describing another example of blocks connected to the CAN communication bus.

Further, instead of controlling a plurality of different functions by the driving control ECU 51, a control unit may be provided for each control content, i.e., each function as shown in, for example, FIG. 4. Note that portions in FIG. 4 corresponding to the portions in FIG. 2 are denoted by the same symbols and their descriptions will be appropriately omitted.

In an example shown in FIG. 4, a plurality of units including the front camera module 71, the communication unit 26, the steering mechanism 27, the sensor unit 28, the braking device 34, the engine 35, the driving motor 37, the headlight 42, a beam control unit 111, an alert notification control unit 112, a steering control unit 113, a brake control unit 114, an accelerator control unit 115, and a learning unit 116 are connected to the CAN communication bus 72.

In the example, the control performed by the driving control ECU 51 in the example of FIG. 2 is shared by the beam control unit 111, the alert notification control unit 112, the steering control unit 113, the brake control unit 114, the accelerator control unit 115, and the learning unit 116.

Specifically, for example, the beam control unit 111 performs control to switch between a low beam and a high beam by controlling the headlight 42 based on an image recognition result acquired by the front camera ECU 22 or the like.

The alert notification control unit 112 performs control to notify a driver of an alert or various information such as various alert displays or guidance displays on the display unit 24 and the output of an alert message or a guidance message to the voice output unit 25 based on an object detection result acquired by the front camera ECU 22 or the like.

The steering control unit 113 performs the control of the traveling direction of the vehicle 11 by controlling the steering mechanism 27 based on an object detection result acquired by the front camera ECU 22, sensor data from the sensor unit 28, or the like.

The brake control unit 114 performs control to stop or decelerate the traveling of the vehicle 11 by controlling the braking device 34 based on an object detection result acquired by the front camera ECU 22, sensor data from the sensor unit 28, or the like.

The accelerator control unit 115 performs control to start or accelerate the vehicle 11 by controlling the engine 35 or the driving motor 37 based on an object detection result acquired by the front camera ECU 22, sensor data from the sensor unit 28, or the like.

The learning unit 116 performs the learning of the driving skills, driving tendencies, or the like of a driver based on the records of a driving operation performed by the driver with respect to the vehicle 11 or the like.

Note that the beam control unit 111, the alert notification control unit 112, the steering control unit 113, the brake control unit 114, and the accelerator control unit 115 will be hereinafter collectively called a vehicle control unit 121.

Further, the configuration example of FIG. 4 among those of FIGS. 2 and 4 will be described hereinafter.

1-2. Configuration Example of Front Camera Module

Next, a configuration example of the front camera module 71 will be described with reference to FIGS. 5 to 8.

Figure 5:
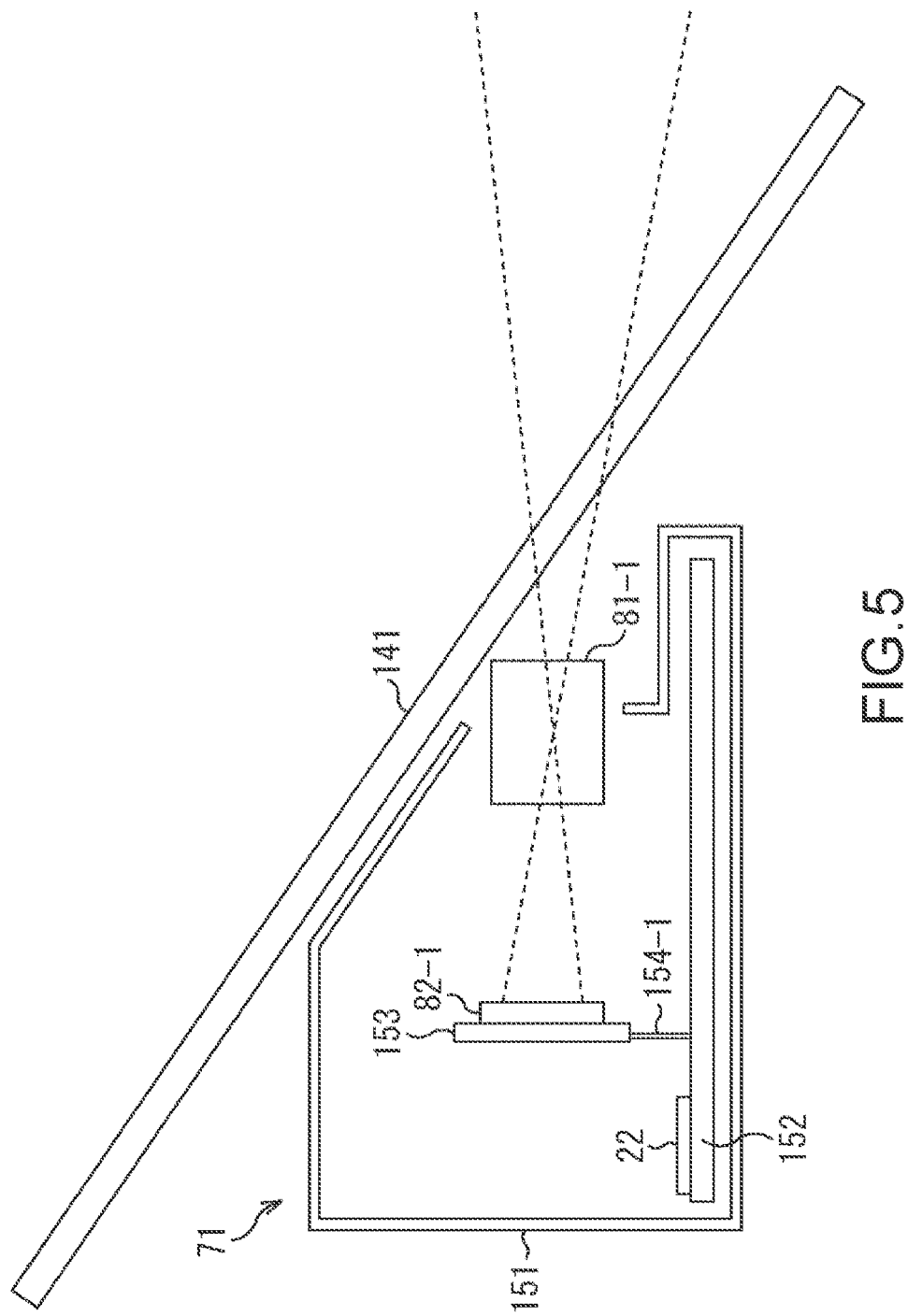
FIG. 5 is a schematic diagram showing a configuration example of the appearance of a front camera module.
Figure 6:
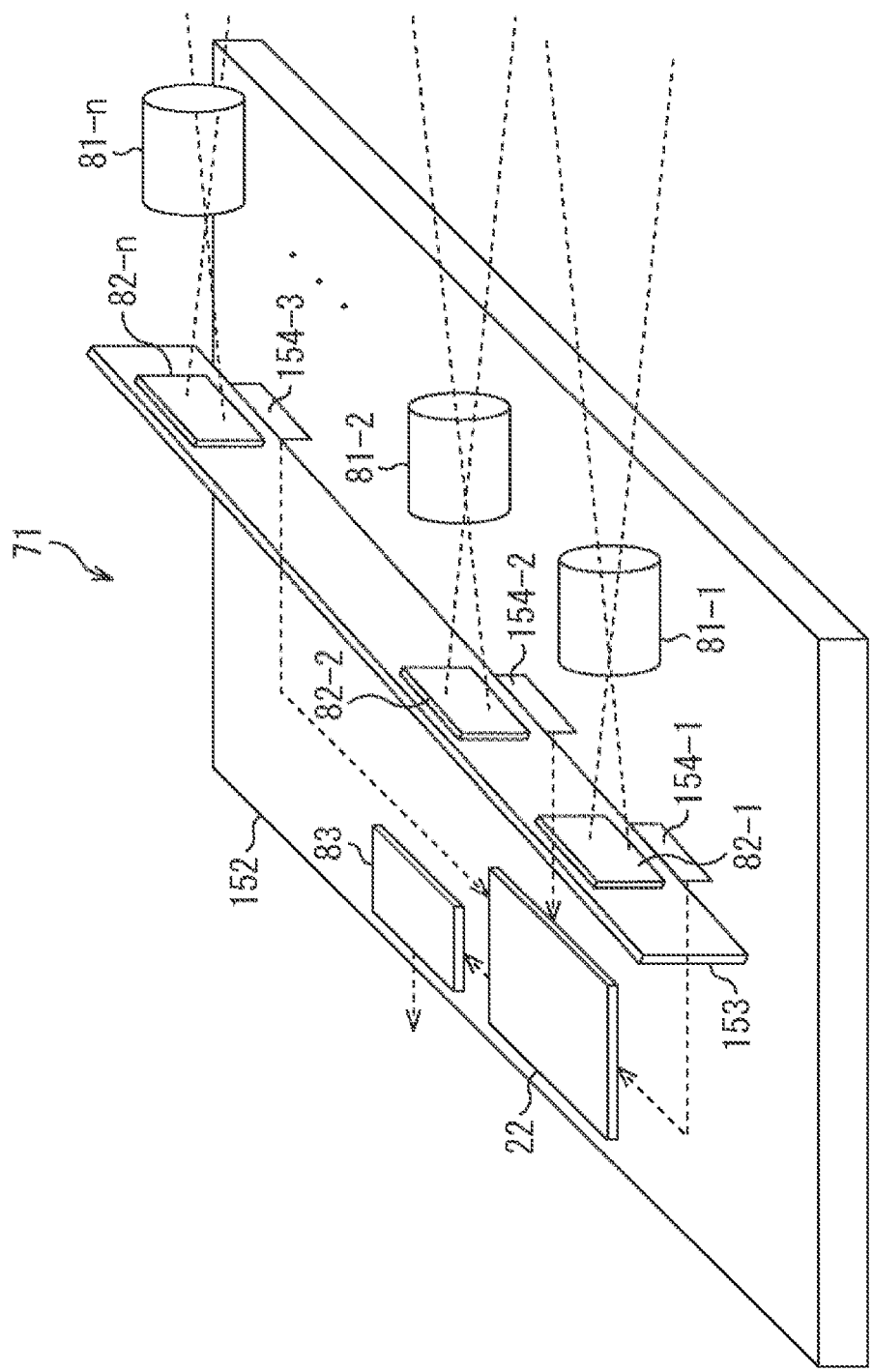
FIG. 6 is a schematic diagram showing the configuration example of the appearance of the front camera module.

FIGS. 5 and 6 schematically show a configuration example of the appearance of the front camera module 71. FIG. 5 is a side schematic view of the appearance of the front camera module 71 provided near a windshield 141 of the vehicle 11. FIG. 6 is a perspective view schematically showing the configuration of a main board 152 of the front camera module 71. Note that the side surface of a housing 151 of the front camera module 71 is made transparent to easily understand the figure, and that the inside of the housing 151 is shown in FIG. 5.

Note that the right side of FIG. 5, i.e., the side of the windshield 141 will be assumed as the front side of the front camera module 71.

The front camera module 71 is provided to come close to the windshield 141 near the rearview mirror (not shown) of the vehicle 11. The front of the housing 151 of the front camera module 71 is formed into a shape corresponding to the windshield 141. Inside the housing 151, each unit such as the main board 152 is stored.

On the upper surface of the main board 152, an image sensor board 153 is provided to extend vertically and horizontally with respect to the upper surface of the main board 152 via FPCs (Flexible Printed Circuits) 154-1 to 154-$n$. On the front surface of the image sensor board 153, image sensors 82-1 to 82-$n$ are arranged to be aligned from side to side in line with the positions of the FPCs 154-1 to 154-$n$.

Further, on the upper surface of the main board 152, lenses 81-1 to 81-$n$ are arranged to be aligned from side to side in line with the positions of the image sensors 82-1 to 82-$n$ in front of the image sensors 82-1 to 82-$n$. Incident light incident on the lenses 81-1 to 81-$n$ forms an image on the imaging surfaces of the image sensors 82-1 to 82-$n$. By the lenses 81-1 to 81-$n$ and the image sensors 82-1 to 82-$n$, front sensing cameras 21-1 to 21-$n$ are constituted. Accordingly, the front camera module 71 makes it possible to simultaneously capture n sensing images by the front sensing cameras 21-1 to 21-$n$.

In addition, at the rear of the image sensor board 153 on the upper surface of the main board 152, the front camera ECU 22 and the MCU 83 are arranged. The image sensors 82-1 to 82-$n$ are separately and electrically connected to the front camera ECU 22 via the FPCs 154-1 to 154-$n$.

Note that the front sensing cameras 21-1 to 21-$n$, the lenses 81-1 to 81-$n$, and the image sensors 82-1 to 82-$n$ will be hereinafter simply called front sensing cameras 21, lenses 81, and image sensors 82, respectively, when they are not required to be separately distinguished from each other.

Figure 7:
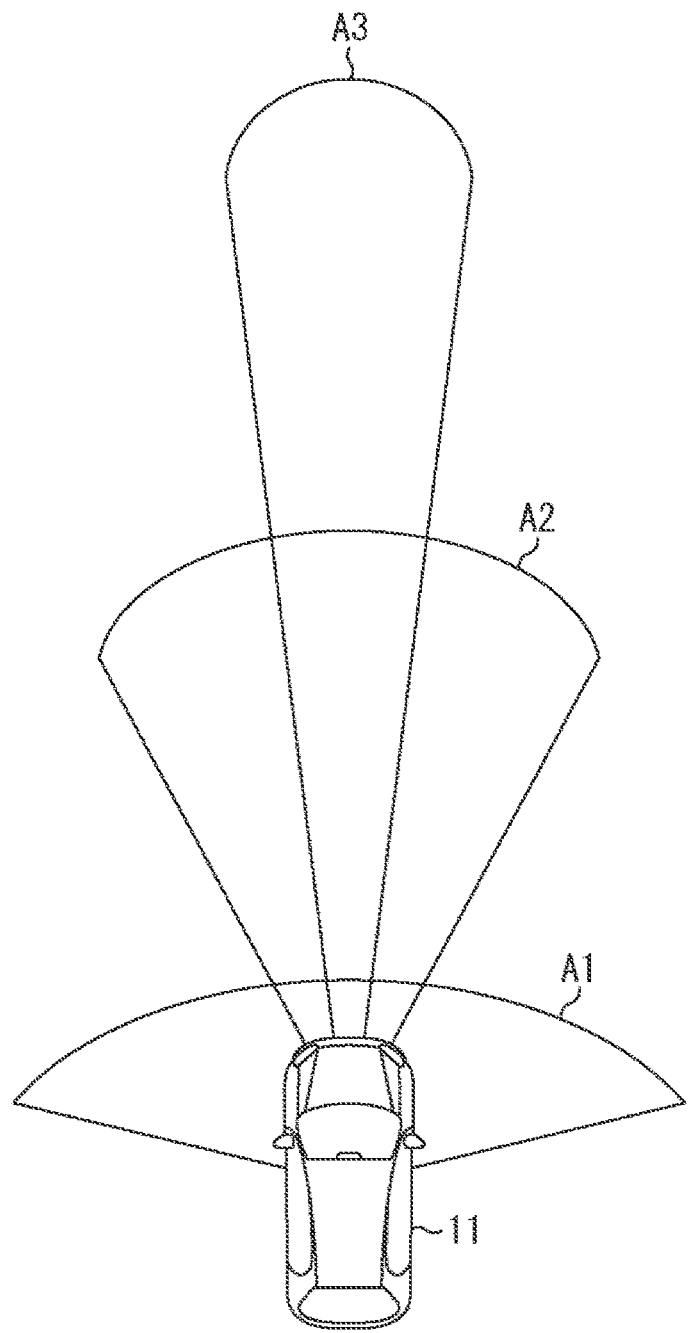
FIG. 7 is a diagram showing an example of the detection ranges of respective front sensing cameras.

FIG. 7 shows an example of the detection ranges (imaging ranges) of the respective front sensing cameras 21. FIG. 7 shows the example of the detection ranges in a case in which the three front sensing cameras 21 of the front sensing cameras 21-1 to 21-3 are provided in the front camera module 71.

Detection ranges A1 to A3 show the detection ranges of the front sensing cameras 21-1 to 21-3, respectively. The visual field angle of the front sensing camera 21-1 is the widest and set at, for example, about 150°. On the other hand, the detection distance of the front sensing camera 21-1 is the shortest and set at, for example, about 20 m. The visual field angle of the front sensing camera 21-2 is the second widest and set at, for example, about 50°. The detection distance of the front sensing camera 21-2 is the second longest and set at, for example, about 120 m. The visual field angle of the front sensing camera 21-3 is the narrowest and set at, for example, about 25°. The detection distance of the front sensing camera 21-3 is the longest and set at, for example, about 150 m.

Accordingly, the use of (the sensing images of) the front sensing cameras 21-1 to 21-3 for different purposes makes it possible to change a detection range (hereinafter called a preferential detection range) in which an object is detected preferentially in front of the vehicle 11.

Figure 8:
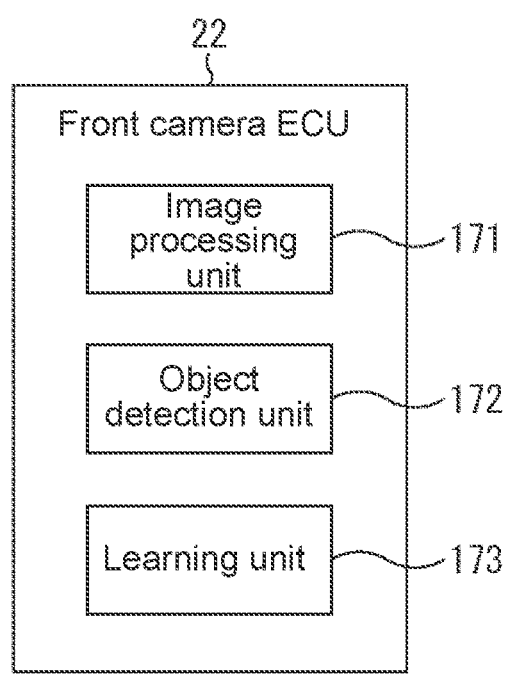
FIG. 8 is a diagram showing a configuration example of the functions of a front camera ECU.

FIG. 8 shows a configuration example of the functions of the front camera ECU 22. The front camera ECU 22 includes an image processing unit 171, an object detection unit 172, and a learning unit 173.

The image processing unit 171 applies, for example, gain control, white balance control, HDR processing, or the like to sensing images supplied from the respective image sensors 82.

The object detection unit 172 performs object detection processing on objects around the vehicle 11 based on sensor data from the sensor unit 28, while performing image recognition for respective sensing images to which image processing has been applied by the image processing unit 171. For example, the object detection unit 172 performs the detection of a pedestrian, a lightweight vehicle such as a bicycle, a vehicle, a headlight, a brakelight, a road sign such as a boundary line, a curb, a road shoulder, a guardrail, and a road marker, the detection of time until the vehicle 11 collides with a front obstacle (for example, a front vehicle or the like), or the like. The object detection unit 172 supplies a detection result to the MCU 83.

The learning unit 173 performs learning processing for improving accuracy in detecting an object around the vehicle 11 based on a detection result of the object detection unit 172 or the like. The object detection unit 172 performs the object detection processing using a learning result of the learning unit 173 where necessary.

1-3. Merging Support Processing

Next, driving support processing performed by the vehicle 11 will be described with reference to the flowchart of FIGS. 9 and 10. The processing is performed to support driving, for example, when the vehicle 11 enters a road from the outside of the road and merges with a roadway inside the road (for example, when the vehicle 11 merges with the roadway from a parking or the like).

Note that the description will be given using FIGS. 11 and 12 as specific examples. Note that a vehicle keeps to the left and a pedestrian keeps to the right since regulations in Japan are assumed in the specific examples. However, the application of the present technology is not limited to Japan and areas in which vehicles keep to the left, but the present technology is also applicable to areas in which vehicles keep to the right. In the case of applying the present technology to areas in which vehicles keep to the right, it is possible to make the present technology applicable by the inversion of the right and left sides of the specific examples.

Figure 11:
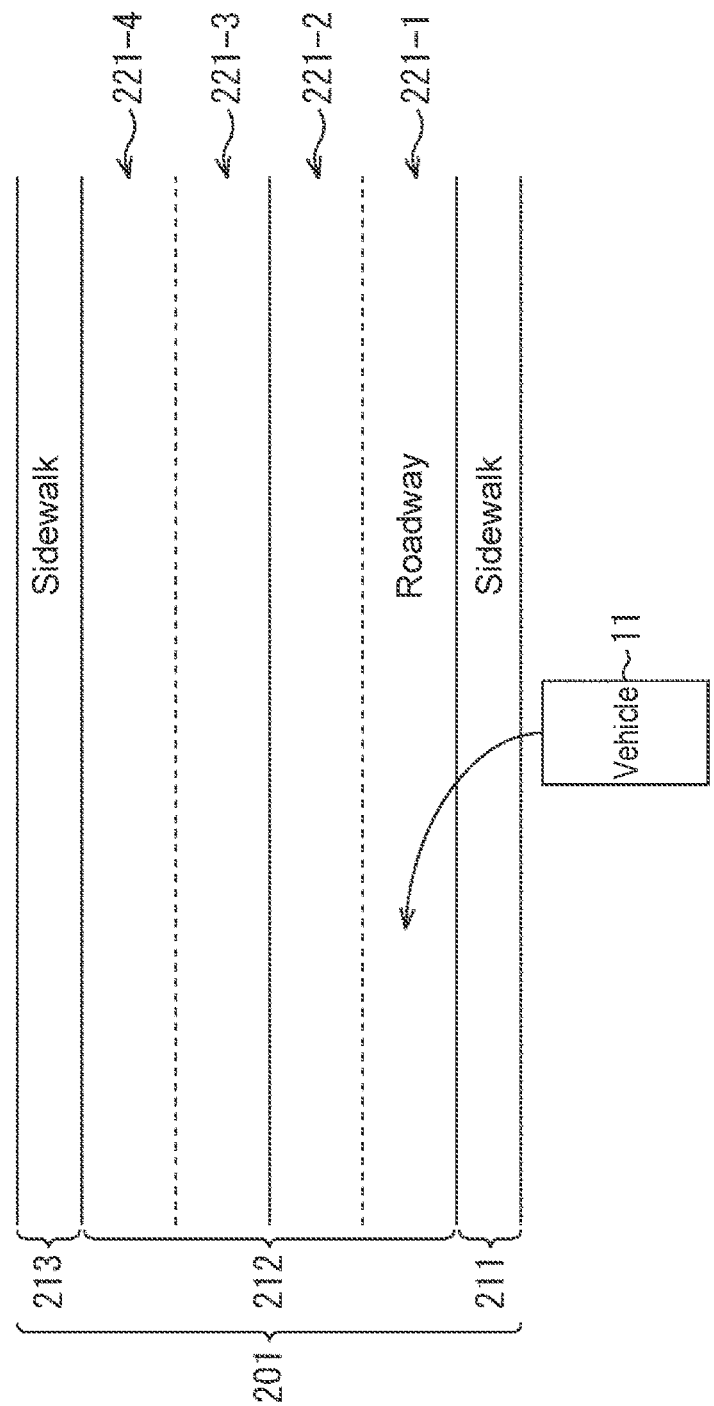
FIG. 11 is a diagram for describing a specific example of the driving support processing.
Figure 12:
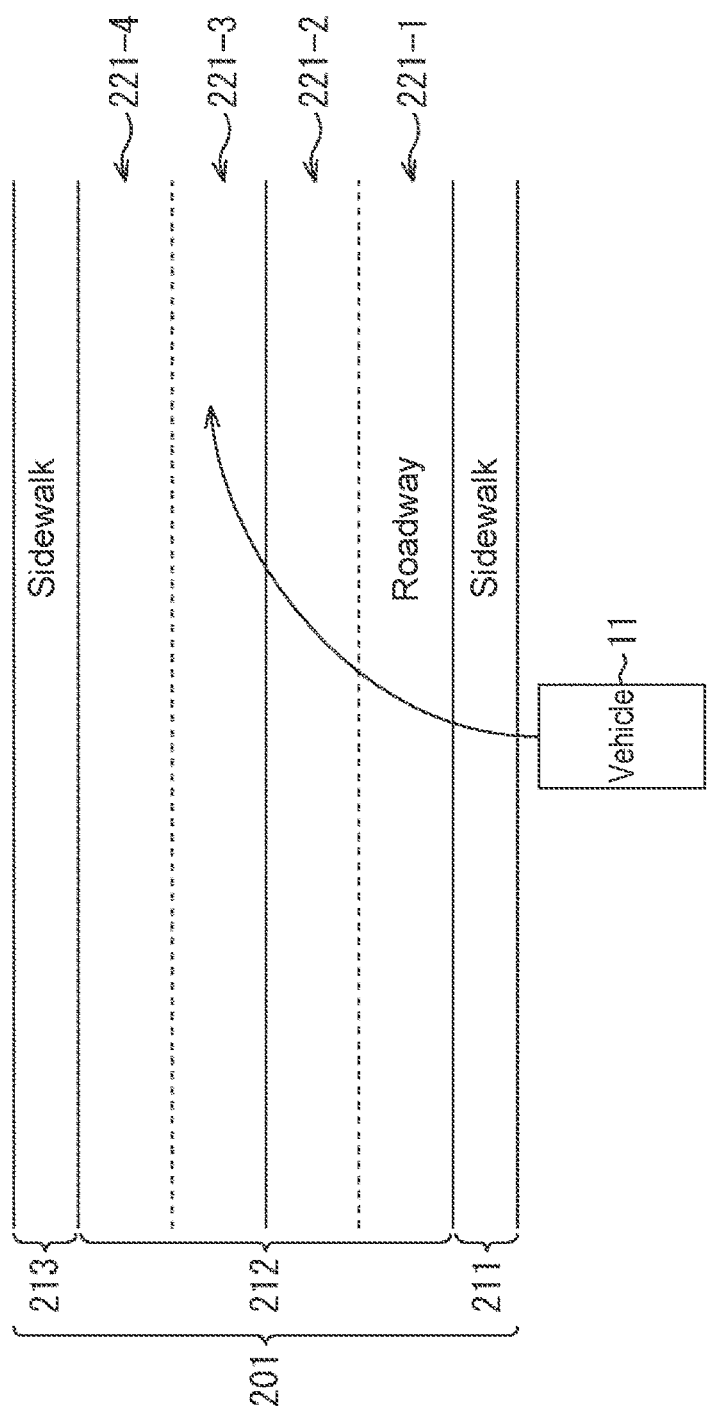
FIG. 12 is a diagram for describing a specific example of the driving support processing.

FIGS. 11 and 12 show examples of cases in which the vehicle 11 enters a road 201 from the outside of the road 201 in front of the vehicle 11 and merges with a roadway 212 inside the road 201.

The road 201 extends in a horizontal direction in front of the vehicle 11. The road 201 is constituted by a sidewalk 211, the roadway 212, and a sidewalk 213 in order from a side closer to the vehicle 11. The roadway 212 is composed of the four lanes of lanes 221-1 to 221-4. The lanes 221-1 and 221-2 are lanes in which the vehicle 11 travels from the right to the left in the figures, and the lanes 221-3 and 221-4 are lanes in which the vehicle 11 travels from the left to the right in the figures.

FIG. 11 shows an example in which the vehicle 11 crosses the sidewalk 211 while turning to the left and then merges with the lane 221-1. FIG. 12 shows an example in which the vehicle 11 crosses the sidewalk 211, the lane 221-1, and the lane 221-2 while turning to the right and then merges with the lane 221-3.

Note that a lane with which the vehicle 11 merges will be hereinafter called a merging lane. The lane 221-1 becomes a merging lane in the example of FIG. 11, and the lane 221-3 becomes a merging lane in the example of FIG. 12. Further, a lane where the vehicle 11 crosses before merging with a merging lane will be hereinafter called a crossing lane. No crossing lane exists in the example of FIG. 11, and the lanes 221-1 and 221-2 become crossing lanes in the example of FIG. 12.

Note that a roadway in the present specification represents a portion of a road through which a vehicle is assumed to pass. That is, the roadway in the present specification includes not only a roadway under law but also a portion of a road regarded as a roadway.

Further, a sidewalk in the present specification represents a portion of a road through which a pedestrian is assumed to pass. Accordingly, the sidewalk includes not only a sidewalk and a pedestrian walkway along a road under law but also a portion of a road regarded as a sidewalk. Note that the sidewalk includes a sidewalk through which an object (for example, a lightweight vehicle such as a bicycle) corresponding to a pedestrian is assumed to pass and a sidewalk through which the object is not assumed to pass.

In addition, a bicycle road in the present specification represents a portion of a road through which a bicycle is assumed to pass preferentially. Accordingly, the bicycle road in the present specification includes not only a bicycle road under law but also a portion of a road regarded as a bicycle road. Note that the bicycle road includes a bicycle road through which not only a bicycle but also a lightweight vehicle other than the bicycle is assumed to pass preferentially.

Note that a pedestrian and an object corresponding to the pedestrian will be hereinafter collectively called a pedestrian or the like.

Figure 9:
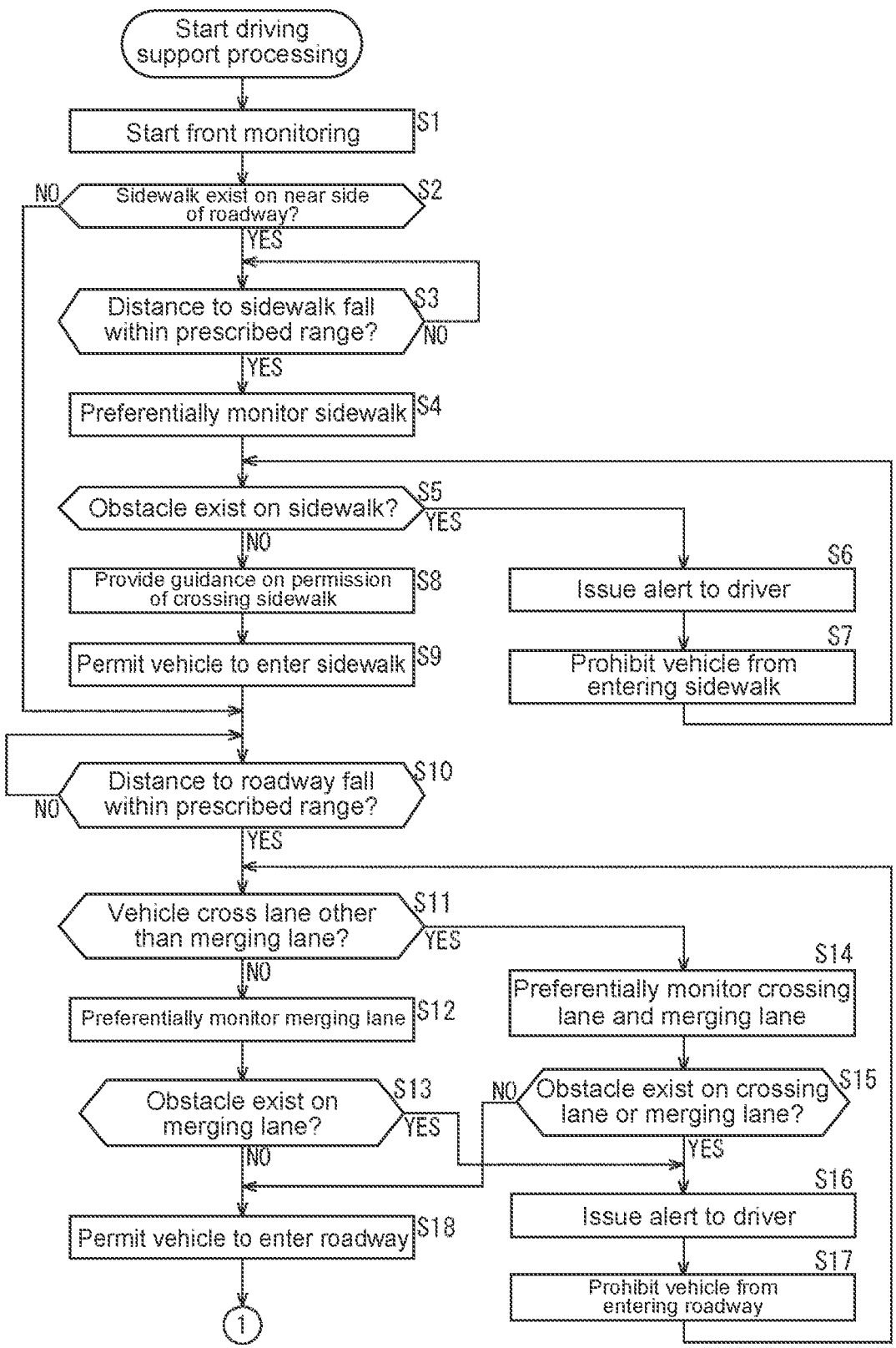
FIG. 9 is a flowchart for describing driving support processing.
Figure 10:
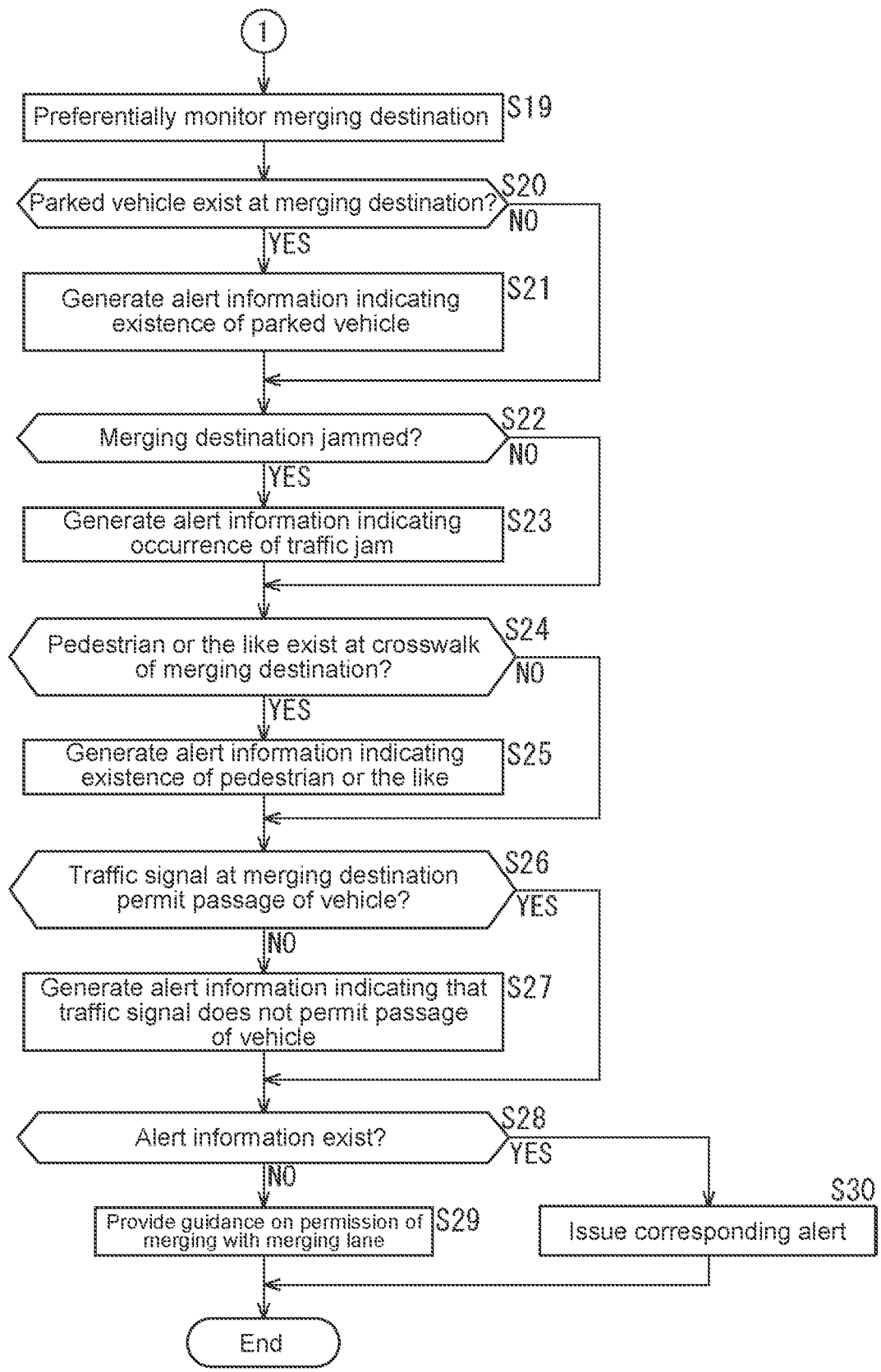
FIG. 10 is a flowchart for describing the driving support processing.

The driving support processing of FIGS. 9 and 10 is started, for example, when the vehicle 11 is activated to perform an operation to start driving, for example, when the ignition switch, the power switch, the start switch, or the like of the vehicle 11 is turned on. Then, the vehicle 11 starts moving forward and approaches a road representing a merging destination.

In step S1, the vehicle 11 starts front monitoring. Specifically, each of the front sensing cameras 21 starts processing to capture an image of the front of the vehicle 11 and supply a sensing image to the front camera ECU 22. Each of the object detection sensors of the sensor unit 28 starts processing to detect the presence or absence of an object around the vehicle 11, a distance to an object, or the like and supply sensor data representing a detection result to the front camera ECU 22 via the bus 72 and the MCU 83 or supply the sensor data to the beam control unit 111, the alert notification control unit 112, the steering control unit 113, the brake control unit 114, the accelerator control unit 115, the learning unit 116, or the like via the bus 72.

The object detection unit 172 starts detection processing to detect an object in front of the vehicle 11 based on the sensing image from each of the front sensing cameras 21 and the sensor data from the sensor unit 28. For example, the object detection unit 172 starts processing to detect a road sign such as a boundary line, a curb, a road shoulder, a guardrail, or the like while detecting a road in front of the vehicle 11 to detect the configuration of the road. Further, the object detection unit 172 starts processing to supply a detection result to the beam control unit 111, the alert notification control unit 112, the steering control unit 113, the brake control unit 114, the accelerator control unit 115, the learning unit 116, or the like via the MCU 83 and the bus 72.

In step S2, the object detection unit 172 determines whether a sidewalk exists on the near side of a roadway. When the object detection unit 172 determines that the sidewalk exists on the near side of the roadway in front of the vehicle 11, the processing proceeds to step S3. This is a case in which the vehicle 11 is required to cross the sidewalk before merging with the roadway.

In step S3, the object detection unit 172 determines whether a distance to the sidewalk falls within a prescribed range. The object detection unit 172 detects, for example, the shortest distance between the sidewalk in front of the vehicle 11 and the vehicle 11 based on the sensing images and the sensor data from the sensor unit 28. Then, the object detection unit 172 repeatedly performs the determination processing of step S3 until the detected shortest distance falls within the prescribed range. Then, when it is determined that the detected shortest distance falls within the prescribed range, the processing proceeds to step S4.

In step S4, the object detection unit 172 preferentially monitors the sidewalk. The object detection unit 172 starts, for example, at least one of detection processing in which the sidewalk is detected as a preferential detection range or detection processing in which a pedestrian or the like is detected as a detection target that is preferentially detected (hereinafter called a preferential detection target).

For example, the object detection unit 172 performs the detection processing using preferentially a sensing image suitable for the detection processing to detect an object on the sidewalk, for example, an image abundantly containing the sidewalk among the sensing images of the respective front sensing cameras 21. Further, the object detection unit 172 performs the detection processing using preferentially the sensor data of a sensor suitable for the detection processing to detect an object on the sidewalk such as, for example, a sensor having a short detection range and a sensor abundantly containing the sidewalk in its detection range among the respective object detection sensors of the sensor unit 28. Alternatively, when there is a sensor capable of changing its detection range among the respective object detection sensors of the sensor unit 28, the object detection unit 172 changes the detection range of the sensor to a region about the sidewalk. Thus, the sidewalk is set as a preferential detection range.

Further, the object detection unit 172 sets, for example, a pedestrian and an object (for example, a lightweight vehicle such as a bicycle) corresponding to the pedestrian that may passes through the sidewalk as targets that are preferentially recognized in image recognition. Thus, the pedestrian or the like is set as a preferential detection target.

As a result, in the examples of FIGS. 11 and 12, the detection processing to detect a pedestrian or the like passing through the sidewalk 211 is preferentially performed when the vehicle 11 approaches the sidewalk 211 within a prescribed distance.

Note that a detection range may or may not be limited to a preferential detection range depending on situations, settings, or the like. In the latter case, the detection processing is intensively performed in the preferential detection range but is also performed in other ranges. Similarly, a detection target may or may not be limited to a preferential detection range target depending on situations, settings, or the like. In the latter case, the detection processing is intensively performed on the preferential detection target but is also performed on other targets.

In step S5, the object detection unit 172 determines whether an obstacle exists on the sidewalk. The object detection unit 172 detects, for example, the position, the movement direction, and the movement speed of an object existing on the sidewalk and the vicinity of the sidewalk. Then, if an object that may collide with or contact the vehicle 11 exists when the vehicle 11 enters the sidewalk as it is, the object detection unit 172 determines that the obstacle exists on the sidewalk and the processing proceeds to step S6.

As the obstacle, a pedestrian, a bicycle, or the like that passes through the sidewalk is mainly assumed. When a pedestrian or a bicycle moves in a direction toward the vehicle 11 inside the sidewalk 211 in the example of FIG. 11 or 12, it is determined that the obstacle exists on the sidewalk and the processing proceeds to step S6.

Note that the object detection unit 172 may make the detection range of a pedestrian or a bicycle narrower in a case in which the pedestrian or the bicycle moves in a direction away from the vehicle 11 in the sidewalk 211, compared with a case in which the pedestrian or the bicycle moves in a direction toward the vehicle 11 in the sidewalk 211. Specifically, for example, in a case in which a pedestrian or a bicycle moves in a direction toward the vehicle 11, the object detection unit 172 may determine that the obstacle exists in a sidewalk when the pedestrian or the like exists within 20 m from the vehicle. In a case in which a pedestrian or a bicycle moves in a direction away from the vehicle 11, the object detection unit 172 may determine that the obstacle exists in a sidewalk when the pedestrian or the like exists within 10 m from the vehicle. This is because the pedestrian or the like moving in the direction away from the vehicle 11 may not relatively collide with the vehicle 11. Thus, the vehicle 11 is permitted to smoothly enter a roadway. Note that a determination as to whether a pedestrian or a bicycle moves in a direction toward the vehicle 11 or moves in a direction away from the vehicle 11 is made using, for example, a difference between a plurality of frames of sensing images captured by the respective front sensing cameras 21.

In step S6, the display unit 24 and the voice output unit 25 issue an alert to a driver through a display image, a voice message, alert sound, or the like under the control of the alert notification control unit 112. For example, the driver is notified of the fact that crossing of the sidewalk is not permitted, or an alert for calling driver's attention to the obstacle is issued to the driver.

Figure 13:
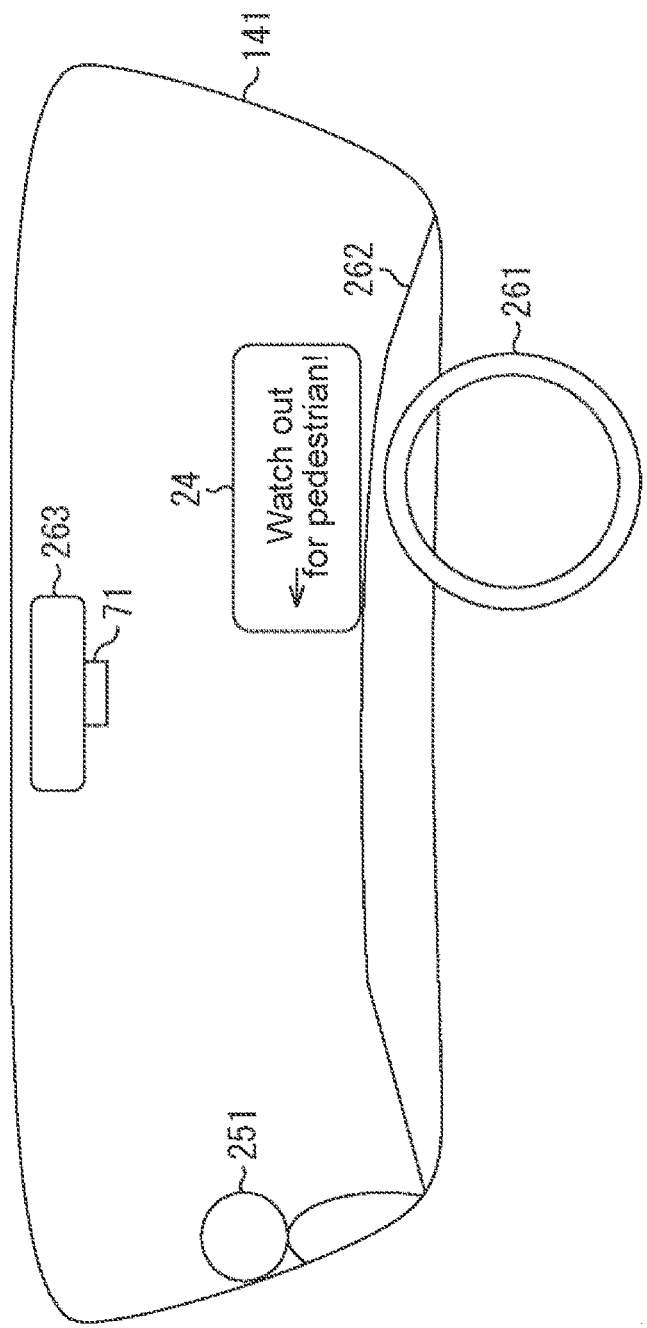
FIG. 13 is a diagram showing a method for issuing an alert to a driver.

FIG. 13 shows an example of a method for issuing an alert to the driver. In the example, a pedestrian 251 approaches from the left front side of the vehicle 11.

Further, in the example, the display unit 24 is constituted by a transmission display provided to be overlapped with the windshield 141 or a combiner head-up display over a steering wheel 261 or on a dashboard 262 of the vehicle 11. Accordingly, the display unit 24 comes into the view of the driver, and thus the driver can easily visually recognize the display unit 24 during driving. Further, on the display unit 24, an arrow representing the position of the pedestrian is displayed together with a message for calling driver's attention to the pedestrian. Thus, the driver becomes aware of the existence of the pedestrian 251, and the vehicle 11 is prevented from colliding with or contacting the pedestrian 251.

Note that the front camera module 71 is provided beneath a rearview mirror 263 in the example.

In step S7, the vehicle control unit 121 prohibits the vehicle 11 from entering the sidewalk. The brake control unit 114 controls, for example, the braking device 34 to stop the vehicle 11. Thus, the vehicle 11 is prohibited from entering the sidewalk and prevented from colliding with or contacting the obstacle (such as, for example, a pedestrian and a bicycle) on the sidewalk. Further, the accelerator control unit 115 controls the engine 35 or the driving motor 37 to prohibit the vehicle 11 from starting.

Note that on this occasion, the brake control unit 114 may adjust the operation degree of the braking device 34 according to predicted collision time with the obstacle. For example, when the predicted collision time with the obstacle is short, the brake control unit 114 controls the braking device 34 to generate a maximum braking force. On the other hand, when the predicted collision time with the obstacle is relatively long, the brake control unit 114 controls the braking device 34 with a braking force with which a comfortable ride for an occupant is not deteriorated. The braking force with which the comfortable ride is not deteriorated represents, for example, a braking force with which a jerk value calculated by the vehicle speed detection unit 41 becomes a prescribed threshold or less. Note that the predicted collision time with the obstacle is calculated based on the distance between the vehicle 11 and the obstacle, the vehicle speed of the vehicle 11, and the acceleration of the vehicle 11.

After that, the processing returns to step S5 to repeatedly perform the processing of steps S5 to S7 until it is determined that no obstacle exists on the sidewalk. Thus, the vehicle 11 is prohibited from entering the sidewalk during a period in which the existence of an obstacle is determined.

On the other hand, the processing proceeds to step S8 when it is determined that no obstacle exists on the sidewalk.

In step S8, the display unit 24 and the voice output unit 25 provide guidance on the permission of crossing the sidewalk through a display image, a voice message, effective sound, or the like under the control of the alert notification control unit 112. For example, guidance on the notification of the fact that crossing of the sidewalk is permitted is provided, or the indication of a timing for starting the vehicle 11 is provided.

In step S9, the vehicle control unit 121 permits the vehicle 11 to enter the sidewalk. Specifically, when the vehicle 11 has been prohibited from entering the sidewalk in step S7, the accelerator control unit 115 controls the engine 35 or the driving motor 37 to cancel the prohibition of the entrance of the vehicle 11 into the sidewalk. Thus, the vehicle 11 is permitted to enter the sidewalk. Then, the vehicle 11 resumes its forward movement to enter the sidewalk and approaches a roadway representing a merging destination.

On the other hand, when the vehicle 11 has not been prohibited from entering the sidewalk, no particular processing is performed in step S9.

Then, the processing proceeds to step S10.

On the other hand, when it is determined that no sidewalk exists on the near side of the roadway, the processing of steps S3 to S9 is skipped and the processing proceeds to step S10.

In step S10, the object detection unit 172 determines whether a distance to the roadway falls within a prescribed range. The object detection unit 172 detects, for example, the shortest distance between the roadway in front of the vehicle 11 and the vehicle 11 based on sensing images and sensor data from the sensor unit 28 before the vehicle 11 enters the roadway. Further, the object detection unit 172 repeatedly performs the determination processing of S10 until the detected shortest distance falls within the prescribed range. Then, when it is determined that the detected shortest distance falls within the prescribed range, the processing proceeds to step S11.

In step S11, the object detection unit 172 determines whether the vehicle 11 crosses a lane other than a merging lane. Specifically, the object detection unit 172 detects whether the vehicle 11 turns to the left or the right based on the position of the direction indication switch of the vehicle 11 not shown. Further, for example, when turning to the left in an area in which the vehicle 11 keeps to the left or when turning to the right in an area in which the vehicle 11 keeps to the right, for example, in the case of FIG. 11, the object detection unit 172 determines that the vehicle 11 does not cross a lane other than a merging lane. On the other hand, when turning to the right in an area in which the vehicle 11 keeps to the left or when turning to the left in an area in which the vehicle 11 keeps to the right, for example, in the case of FIG. 12, the object detection unit 172 determines that the vehicle 11 crosses a lane other than a merging lane.

Note that even when turning to the left in an area in which the vehicle 11 keeps to the left or even when turning to the right in an area in which the vehicle 11 keeps to the right, it may be determined that the vehicle 11 crosses a lane other than a merging lane depending on the configuration of a road or the like. For example, when the vehicle 11 merges with the inner lane of two or more lanes of a roadway, for example, in the case of FIG. 11, the vehicle 11 crosses a lane 221-1 and merges with a lane 221-2.

Further, even when turning to the right in an area in which the vehicle 11 keeps to the left or even when turning to the left in an area in which the vehicle 11 keeps to the right, it may be determined that the vehicle 11 does not cross a lane other than a merging lane depending on the configuration of a road or the like. For example, when a road with which the vehicle 11 merges is a one-way road, the vehicle 11 does not cross a lane other than the merging lane.

Then, when it is determined that the vehicle 11 does not cross a lane other than the merging lane, the processing proceeds to step S12.

In step S12, the object detection unit 172 preferentially monitors the merging lane. Specifically, the object detection unit 172 starts at least one of detection processing in which the merging lane is detected as a preferential detection range or detection processing in which another vehicle is detected as a preferential detection target.

The object detection unit 172 performs, for example, the detection processing using preferentially a sensing image suitable for the detection processing to detect an object on the merging lane, for example, an image abundantly containing the merging lane among the sensing images of the respective front sensing cameras 21. Further, the object detection unit 172 performs the detection processing using preferentially the sensor data of a sensor suitable for the detection processing to detect an object on the merging lane such as, for example, a sensor having a long detection distance and a sensor abundantly containing the merging lane in its detection range among the respective object detection sensors of the sensor unit 28. Alternatively, when there is a sensor capable of changing its detection range among the respective object detection sensors of the sensor unit 28, the object detection unit 172 changes the detection range of the sensor to a region about the merging lane. Thus, the merging lane is set as a preferential detection range.

Further, for example, the object detection unit 172 sets another vehicle as a target that is preferentially recognized in image recognition. Thus, another vehicle is set as a preferential detection target.

As a result, in the example of FIG. 11, detection processing to detect a vehicle on the lane 221-1 representing a merging lane is preferentially performed when the vehicle 11 approaches the roadway 212 within a prescribed distance.

Note that a region in which another vehicle (hereinafter called an approaching vehicle) approaching the vehicle 11 may exist in the merging lane, i.e., a region at the rear of a position at which the vehicle 11 merges in the merging lane is desirably set as a range in which an object is particularly preferentially detected. Thus, detection processing to detect the approaching vehicle approaching the position at which the vehicle 11 merges in the merging lane is preferentially performed.

Further, like the processing of step S4, the detection range may or may not be limited to the preferential detection range depending on situations, settings, or the like. Similarly, the detection target may or may not be limited to the preferential detection range target depending on situations, settings, or the like.

In step S13, the object detection unit 172 determines whether an obstacle exists on the merging lane. For example, the object detection unit 172 detects the position, the movement direction, and the movement speed of an object existing on the merging lane and the vicinity of the merging lane. Then, if an object that may collide with or contact the vehicle 11 exists when the vehicle 11 enters the merging lane as it is, the object detection unit 172 determines that the obstacle exists on the merging lane and the processing proceeds to step S16.

As the obstacle, an approaching vehicle that approaches a position at which the vehicle 11 merges in the merging lane is mainly assumed. When another vehicle approaches a position at which the vehicle 11 merges from the right inside the lane 221-1 in the example of FIG. 11, it is determined that the obstacle exists on the merging lane and the processing proceeds to step S16.

On the other hand, when it is determined in step S11 that the vehicle 11 crosses a lane other than the merging lane, the processing proceeds to step S14.

In step S14, the object detection unit 172 preferentially monitors the crossing lane and the merging lane. Specifically, the object detection unit 172 starts at least one of detection processing in which the crossing lane and the merging lane are detected as preferential detection ranges or detection processing in which another vehicle is detected as a preferential detection target.

For example, the object detection unit 172 performs the detection processing using preferentially a sensing image suitable for the detection processing to detect an object on the crossing lane or the merging lane, for example, an image abundantly containing the crossing lane or the merging lane among the sensing images of the respective front sensing cameras 21. Further, the object detection unit 172 performs the detection processing using preferentially the sensor data of a sensor suitable for the detection processing to detect an object on the crossing lane or the merging lane such as, for example, a sensor having a long detection distance and a sensor abundantly containing the crossing lane or the merging lane in its detection range among the respective object detection sensors of the sensor unit 28. Alternatively, when there is a sensor capable of changing its detection range among the respective object detection sensors of the sensor unit 28, the object detection unit 172 changes the detection range of the sensor to a region about the crossing lane or the merging lane. Thus, the crossing lane and the merging lane are set as preferential detection ranges.

Further, for example, the object detection unit 172 sets another vehicle as a target that is preferentially recognized in image recognition. Thus, another vehicle is set as a preferential detection target.

As a result, in the example of FIG. 12, detection processing to detect vehicles on the lanes 221-1 and 221-2 representing crossing lanes and vehicles on the lane 221-3 representing a merging lane is preferentially performed when the vehicle 11 approaches the roadway 212 within a prescribed distance.

Note that a region in which an approaching vehicle approaching the vehicle 11 may exist in a crossing lane and a merging lane, i.e., a region at the rear of a position at which the vehicle 11 crosses in the crossing lane and a region at the rear of a position at which the vehicle 11 merges in the merging lane are desirably set as ranges in which an object is particularly preferentially detected. Thus, detection processing to detect the approaching vehicle approaching the position at which the vehicle 11 crosses or merges in the crossing lane and the merging lane is preferentially performed.

Further, like the processing of steps S4 and S12, the detection range may or may not be limited to the preferential detection range depending on situations, settings, or the like. Similarly, the detection target may or may not be limited to the preferential detection range target depending on situations, settings, or the like.

Note that a target preferentially monitored may or may not be set until the merging lane is preferentially monitored in step S12 or the crossing lane and the merging lane are preferentially monitored in step S14 after the vehicle 11 is permitted to enter the sidewalk in step S9. For example, when a target preferentially monitored is set, the sidewalk may be preferentially monitored until the vehicle 11 enters the sidewalk and the merging lane or the crossing lane and the merging lane may be preferentially monitored after the vehicle 11 enters the sidewalk. Alternatively, processing to preferentially monitor the sidewalk may be continued until it is determined in step S10 that the distance to the roadway falls within the prescribed range.

In step S15, the object detection unit 172 determines whether an obstacle exists on the crossing lane or the merging lane. The object detection unit 172 detects, for example, the position, the movement direction, and the movement speed of an object existing on the crossing lane, the merging lane, and the vicinities of the crossing lane and the merging lane. Then, if an object that may collide with or contact the vehicle 11 exists when the vehicle 11 enters the crossing lane or the merging lane as it is, the object detection unit 172 determines that the obstacle exists on the crossing lane or the merging lane and the processing proceeds to step S16.

As the obstacle, an approaching vehicle approaching a position at which the vehicle 11 crosses in the crossing lane or an approaching vehicle approaching a position at which the vehicle 11 merges in the merging lane is mainly assumed. In the example of FIG. 12, when another vehicle approaches a position at which the vehicle 11 crosses from the right inside the lanes 221-1 and 221-2 or when another vehicle approaches a position at which the vehicle 11 merges from the left inside the lane 221-3, it is determined that the obstacle exists on the crossing lane or the merging lane and the processing proceeds to step S16.

In step S16, the display unit 24 and the voice output unit 25 issue an alert to the driver through a display image, a voice message, alert sound, or the like under the control of the alert notification control unit 112. For example, the driver is notified of the fact that entering the roadway is not permitted, or an alert for calling driver's attention to the obstacle is issued to the driver.

In step S17, the vehicle control unit 121 prohibits the vehicle 11 from entering the roadway. For example, the brake control unit 114 controls the braking device 34 to stop the vehicle 11. Thus, the vehicle 11 is prohibited from entering the roadway and prevented from colliding with or contacting the obstacle (such as, for example, another vehicle) on the roadway. Further, the accelerator control unit 115 controls the engine 35 or the driving motor 37 to prohibit the vehicle 11 from starting.

Then, the processing returns to step S11, and the processing of steps S11 to S17 is repeatedly performed until it is determined in step S13 that no obstacle exists on the merging lane or it is determined in step S15 that no obstacle exists on the crossing lane and the merging lane. Thus, the vehicle 11 is prohibited from entering the roadway during a period in which it is determined that an obstacle exists. Further, when a direction in which the vehicle 11 merges is changed during a period in which the vehicle 11 is prevented from entering the roadway, a region preferentially monitored is changed.

On the other hand, when it is determined in step S13 that no obstacle exists on the merging lane or when it is determined in step S15 that no obstacle exists on the crossing lane and the merging lane, the processing proceeds to step S18.

In step S18, the vehicle 11 is permitted to enter the roadway. Specifically, when the vehicle 11 has been prohibited from entering the roadway in step S17, the accelerator control unit 115 controls the engine 35 or the driving motor 37 to cancel the prohibition of the starting of the vehicle 11. Thus, the vehicle 11 is permitted to enter the roadway.

On the other hand, when the vehicle 11 has not been prohibited from entering the roadway, no particular processing is performed in step S18.

In step S19, the object detection unit 172 preferentially monitors a merging destination. Here, the merging destination represents a region at the front of a position at which the vehicle 11 merges in the merging lane. The object detection unit 172 starts detection processing to preferentially detect the situation of the merging destination.

The object detection unit 172 performs, for example, monitoring using preferentially a sensing image suitable for the monitoring of the merging destination, for example, an image abundantly containing the merging destination among the sensing images of the respective front sensing cameras 21. Further, the object detection unit 172 performs the detection processing using preferentially the sensor data of a sensor suitable for the detection processing to detect an object at the merging destination such as, for example, a sensor having a long detection distance and a sensor abundantly containing the merging destination in its detection range among the respective object detection sensors of the sensor unit 28. Alternatively, when there is a sensor capable of changing its detection range among the respective object detection sensors of the sensor unit 28, the object detection unit 172 changes the detection range of the sensor to a region about the merging destination. Thus, the merging destination is set as a preferential detection range.

Further, the object detection unit 172 sets a vehicle, a pedestrian, a traffic signal, a crosswalk, or the like that may exist at the merging destination as a preferential detection target.

Thus, detection processing to detect the situation of the merging destination is preferentially performed. In the example of FIG. 11, detection processing to detect a vehicle, a pedestrian, a traffic signal, a crosswalk, or the like at the front of a position at which the vehicle 11 merges in the lane 221-1 is preferentially performed. Further, in the example of FIG. 12, detection processing to detect a vehicle, a pedestrian, a traffic signal, a crosswalk, or the like at the front of a position at which the vehicle 11 merges in the lane 221-3 is preferentially performed.

In step S20, the object detection unit 172 determines whether a parked vehicle exists at the merging destination. When it is determined that a parked vehicle exists at the merging destination, the processing proceeds to step S21.

In step S21, the alert notification control unit 112 generates alert information representing the existence of the parked vehicle.

Then, the processing proceeds to step S22.

On the other hand, when it is determined in step S20 that no parked vehicle exists at the merging destination, the processing of step S21 is skipped and the processing proceeds to step S22.

In step S22, the object detection unit 172 determines whether the merging destination is jammed. When it is determined that the merging destination is jammed, the processing proceeds to step S23.

In step S23, the alert notification control unit 112 generates alert information representing the occurrence of a traffic jam.

Then, the processing proceeds to step S24.

On the other hand, when it is determined in step S22 that the merging destination is not jammed, the processing of step S23 is skipped and the processing proceeds to step S24.

In step S24, the object detection unit 172 determines whether a pedestrian or the like exists at the crosswalk of the merging destination. When a crosswalk exists at the merging destination and a pedestrian or the like exists at the crosswalk, the object detection unit 172 determines that the pedestrian or the like exists at the crosswalk of the merging destination and the processing proceeds to step S25.

In step S25, the alert notification control unit 112 generates alert information representing the existence of the pedestrian or the like.

Then, the processing proceeds to step S26.

On the other hand, when it is determined in step S24 that no pedestrian or the like exists at the crosswalk of the merging destination or no crosswalk exists at the merging destination, the processing of step S25 is skipped and the processing proceeds to step S26.

In step S26, the object detection unit 172 determines whether a traffic signal at the merging destination permits the passage of the vehicle 11. The object detection unit 172 determines that the traffic signal at the merging destination does not permit the passage of the vehicle 11 when the traffic signal exists at the merging destination and does not permit the passage of the vehicle 11 (the traffic signal turns, for example, yellow or red), the object detection unit 172 determines that the traffic signal does not permit the passage of the vehicle 11 and the processing proceeds to step S27.

Note that when the traffic signal at the merging destination is detected, at least any one of the front camera ECU 22 or the image sensor 82 desirably performs flicker correction processing on the traffic signal. Thus, the lighting state of the traffic signal can be reliably determined.

In step S27, the alert notification control unit 112 generates alert information representing the fact that the traffic signal does not permit the passage of the vehicle 11.

Then, the processing proceeds to step S28.

On the other hand, when it is determined in step S26 that the traffic signal at the merging destination permits the passage of the vehicle 11 (the traffic signal at the merging destination turns, for example, blue) or no traffic signal exists at the merging destination, the processing of the step S27 is skipped and the processing proceeds to step S28.

In step S28, the alert notification control unit 112 determines whether the alert information exists. When all the processing steps of steps S21, S23, S25, and S27 are skipped, the alert notification control unit 112 determines that the alert information does not exist and the processing proceeds to step S29.

In step S29, the display unit 24 and the voice output unit 25 provide guidance on the permission of merging with the merging lane through a display image, a voice message, effect sound, or the like under the control of the alert notification control unit 112. For example, the driver is notified of the fact that the vehicle 11 is permitted to merge with the merging lane.

Further, for example, guidance for causing the vehicle 11 to merge with the merging lane is shown where necessary. For example, a timing for causing the vehicle 11 to merge with the merging lane, a speed, a direction in which the vehicle 11 turns to the left or the right, or the like is shown to the driver on the display unit 24 in FIG. 13. For example, as the merging timing, remaining time before a timing suitable for starting the vehicle 11 to merge with the merging lane is shown in a countdown form (such as, for example, three seconds later and one second later). Alternatively, the merging timing is shown by an intuitive expression such as "shortly" and "now." Further, as the direction in which the vehicle 11 turns to the left or the right, the recommended rotation angle of a steering wheel is, for example, shown. Thus, even the driver with low driving skills can easily cause the vehicle 11 to merge with the merging lane.

Note that the starting timing, the speed, and the direction in which the vehicle 11 turns to the left or the right are set based on, for example, the widths of the merging lane and the crossing lane, the speed of an approaching vehicle on the merging lane or the crossing lane, and the step between the sidewalk and the roadway, or the like. In addition, as the starting speed, a starting speed considering the comfortable ride of an occupant may be set based on the differential (jerk) of acceleration detected by the vehicle speed detection unit 41.

Further, it is also possible to show a part or the whole of the guidance for causing the vehicle 11 to merge with the merging lane before and after the processing of step S18.

Then, the driving support processing ends.

On the other hand, when the alert information has been generated in at least one of the processing steps of steps S21, S23, S25, and S27, the alert notification control unit 112 determines that the alert information exists and the processing proceeds to step S30.

In step S30, the display unit 24 and the voice output unit 25 issue a corresponding alert through a display image, a voice message, alert sound, or the like under the control of the alert notification control unit 112. For example, the driver is notified of the fact that a parked vehicle exists at the merging destination, the fact that the merging destination is jammed, the fact that a pedestrian exists at the crosswalk of the merging destination, or the fact that a traffic signal at the merging destination does not permit the passage of the vehicle 11, or an alert for calling driver's attention is issued.

Further, for example, like the processing of step S29, guidance for causing the vehicle 11 to merge with the merging lane is shown.

In addition, for example, the vehicle control unit 121 controls the traveling of the vehicle 11 so as to avoid a risk factor where necessary. Here, the risk factor represents, for example, a parked vehicle at the merging destination, a jammed vehicle at the merging destination, collision or contact with a pedestrian at the crosswalk of the merging destination, the neglect of a traffic signal at the merging destination, or the like. For example, in order to avoid the risk factor, the brake control unit 114 controls the braking device 34 to decelerate or stop the vehicle 11, or the steering control unit 113 controls the steering mechanism 27 to control the traveling direction of the vehicle 11.

Further, when the vehicle 11 merges with the roadway of two or more lanes, the alert notification control unit 112 may control the display unit 24 or the voice output unit 25 to provide guidance for causing the vehicle 11 to merge with a lane different from a jammed lane. In the case of FIG. 11, when the lane 221-1 is jammed and the lane 221-2 is not jammed, guidance for causing the vehicle 11 to merge with the lane 221-2 is provided. Further, in the case of FIG. 12, when the lane 221-3 is jammed and the lane 221-4 is not jammed, guidance for causing the vehicle 11 to merge with the lane 221-4 is provided.

Then, the driving support processing ends.

Note that the processing of step S19 and the subsequent steps may be performed at any timing before or after the vehicle 11 enters the roadway. However, when the driver has low driving skills, the vehicle 11 desirably enters the roadway after the guidance for causing the vehicle 11 to enter and merge with the roadway is shown in steps S29 and S30.

In the manner described above, the driving support when the vehicle enters the road from the outside of the road is properly performed. As a result, the driver can easily cause the vehicle 11 to merge with a desired lane inside the road from the outside of the road.

2. Modified Examples

Hereinafter, modified examples of the above embodiment of the technology according to the present disclosure will be described.

2-1. Modified Example about Object Detection Processing

The above description shows an example in which the object detection method is changed based on the distance between the vehicle 11 and a road. Specifically, when the distance between the vehicle 11 and a sidewalk falls within a prescribed range, processing to preferentially detect a pedestrian or the like on the sidewalk is performed. When the distance between the vehicle 11 and a roadway falls within a prescribed range, processing to preferentially detect another vehicle on the roadway (a merging lane or a crossing lane and the merging lane) is performed.

On the other hand, the object detection method may be changed based on the positional relationship between the vehicle 11 and a road other than a distance. For example, when a sidewalk exists in a road where the vehicle 11 enters, processing to preferentially detect a pedestrian or the like on the sidewalk may be performed regardless of the distance between the vehicle 11 and the sidewalk until the vehicle 11 enters the sidewalk. Then, after the vehicle 11 enters the sidewalk (i.e., after the distance between the vehicle 11 and the sidewalk becomes zero), processing to preferentially detect another vehicle on a roadway may be performed regardless of the distance between the vehicle 11 and the roadway.

Further, for example, when no sidewalk exists in the road where the vehicle 11 enters, processing to preferentially detect another vehicle on the roadway may be performed regardless of the distance between the vehicle 11 and the roadway until the vehicle 11 enters the roadway.

In addition, the above description shows an example in which a preferential detection region is changed depending on whether the vehicle 11 crosses another lane. However, the preferential detection region may not be changed depending on whether the vehicle 11 crosses another lane. For example, all the lanes where the vehicle 11 enters may be set as preferential detection regions regardless of whether the vehicle 11 crosses another lane.

Further, for example, a front image, a rear image, a side image, or the like other than sensing images may be used where necessary to perform the object detection processing.

In addition, the present technology can also be applied to, for example, a case in which the object detection processing is performed using the front sensing camera 21 or the object detection sensors. Further, the present technology can also be applied to, for example, a case in which the object detection processing is performed using a single front sensing camera 21 instead of the plurality of front sensing cameras 21. Similarly, the present technology can also be applied to a case in which the object detection processing is performed using one object detection sensor instead of the plurality of object detection sensors.

2-2. Modified Example about Driving Support

Figure 14:
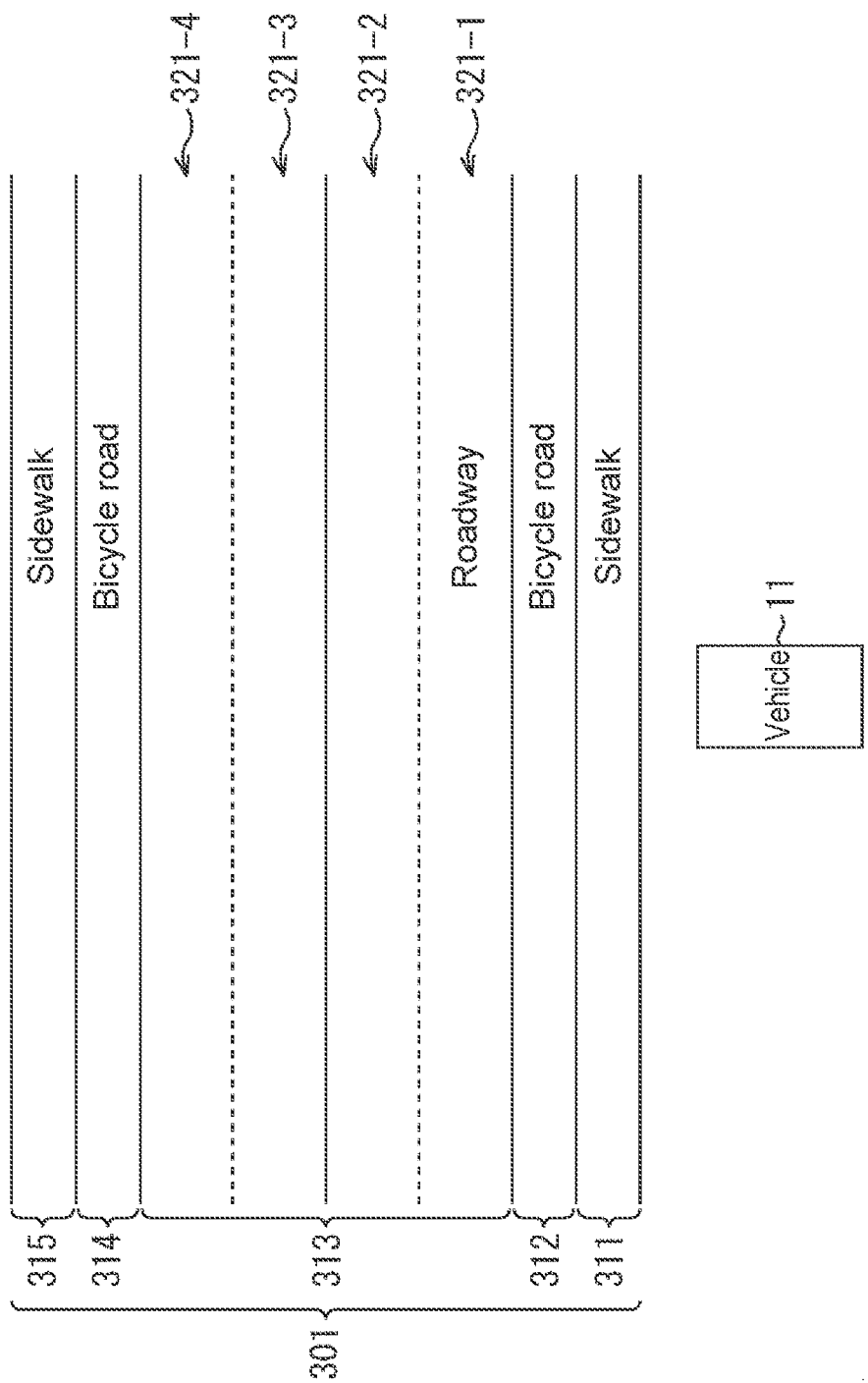
FIG. 14 is a diagram showing a configuration example of a road including a bicycle road.

As shown in, for example, FIG. 14, there is a case in which a bicycle road is provided between a sidewalk and a roadway. Specifically, a road 301 in FIG. 14 is constituted by a sidewalk 311, a bicycle road 312, a roadway 313, a bicycle road 314, and a sidewalk 315 in order from a side closer to the vehicle 11. The roadway 313 is composed of the four lanes of lanes 321-1 to 321-4.

In this case, the bicycle road is preferentially monitored, for example, before the vehicle 11 enters the bicycle road 312 after entering the sidewalk 311. For example, at least one of detection processing in which the bicycle road is detected as a preferential detection range or detection processing in which a bicycle and an object corresponding to the bicycle are detected as preferential detection targets is performed. Then, the vehicle 11 is prohibited from entering the bicycle road when it is determined that an obstacle exists on the bicycle road, or the vehicle 11 is permitted to enter the bicycle road when it is determined that no obstacle exists on the bicycle road.

Figure 15:
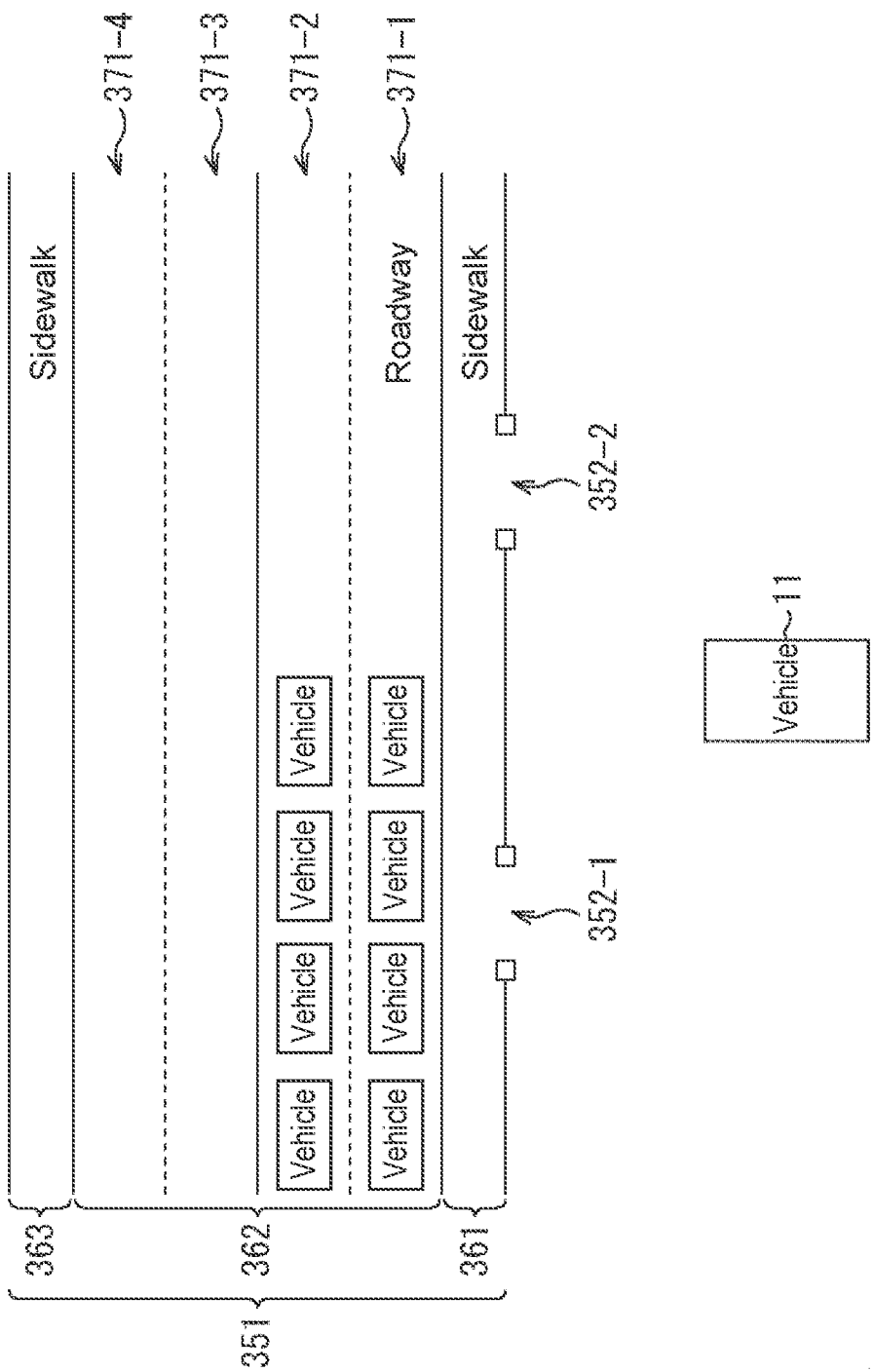
FIG. 15 is a diagram showing a configuration example of a road having two gateways.

Further, when two or more gates for merging with a roadway are provided in a parking or the like as shown in, for example, FIG. 15, the vehicle 11 may be guided to one of the gates through which the vehicle 11 is permitted to more easily merge with the roadway.

A road 351 in FIG. 15 is constituted by a sidewalk 361, a roadway 362, and a sidewalk 363 in order from a side closer to the vehicle 11. The roadway 362 is composed of the four lanes of lanes 371-1 to 371-4. Further, gateways 352-1 and 352-2 are provided as gateways for the road 351 on the side of the sidewalk 361. In addition, the lanes 371-1 and 371-2 are jammed from the left side of the gateway 352-2.

When exiting from, for example, the gateway 352-1 to merge with the lane 371-1, the vehicle 11 has a difficulty in merging with the lane 371-1 since vehicles are jammed. On the other hand, when exiting from the gateway 352-2, the vehicle 11 is permitted to easily merge with the lane 371-2 since no vehicles are jammed compared with a case in which the vehicle 11 exits from the gateway 352-1.

Therefore, the object detection unit 172 detects, for example, the positions of the gateways 352-1 and 352-2 and the jammed situations of the lanes 371-1 and 371-2. Then, the alert notification control unit 112 controls the display unit 24 and the voice output unit 25 based on detection results to show guidance or the like for guiding the driver to exit from the gateway 352-2.

Note that besides the above example, the vehicle 11 may be guided to, for example, a clear gateway, a gateway through which a pedestrian or the like approaching on a sidewalk is easily detected, or the like.

Further, when a merging lane or a crossing lane is jammed, a driver with low driving skills has a difficulty in merging with the merging lane while threading his/her way through jammed vehicles. Therefore, guidance for causing the vehicle 11 to merge with the merging lane may be provided. The object detection unit 172 detects, for example, the distances between vehicles traveling on the merging lane or the crossing lane, the speeds of the vehicles, vehicles that stop to make way, or the like. Further, the alert notification control unit 112 may control the display unit 24 and the voice output unit 25 based on detection results to show guidance such as a timing at which the vehicle 11 merges with the merging lane while threading its way through the jammed vehicles, or the like.

Figure 16:
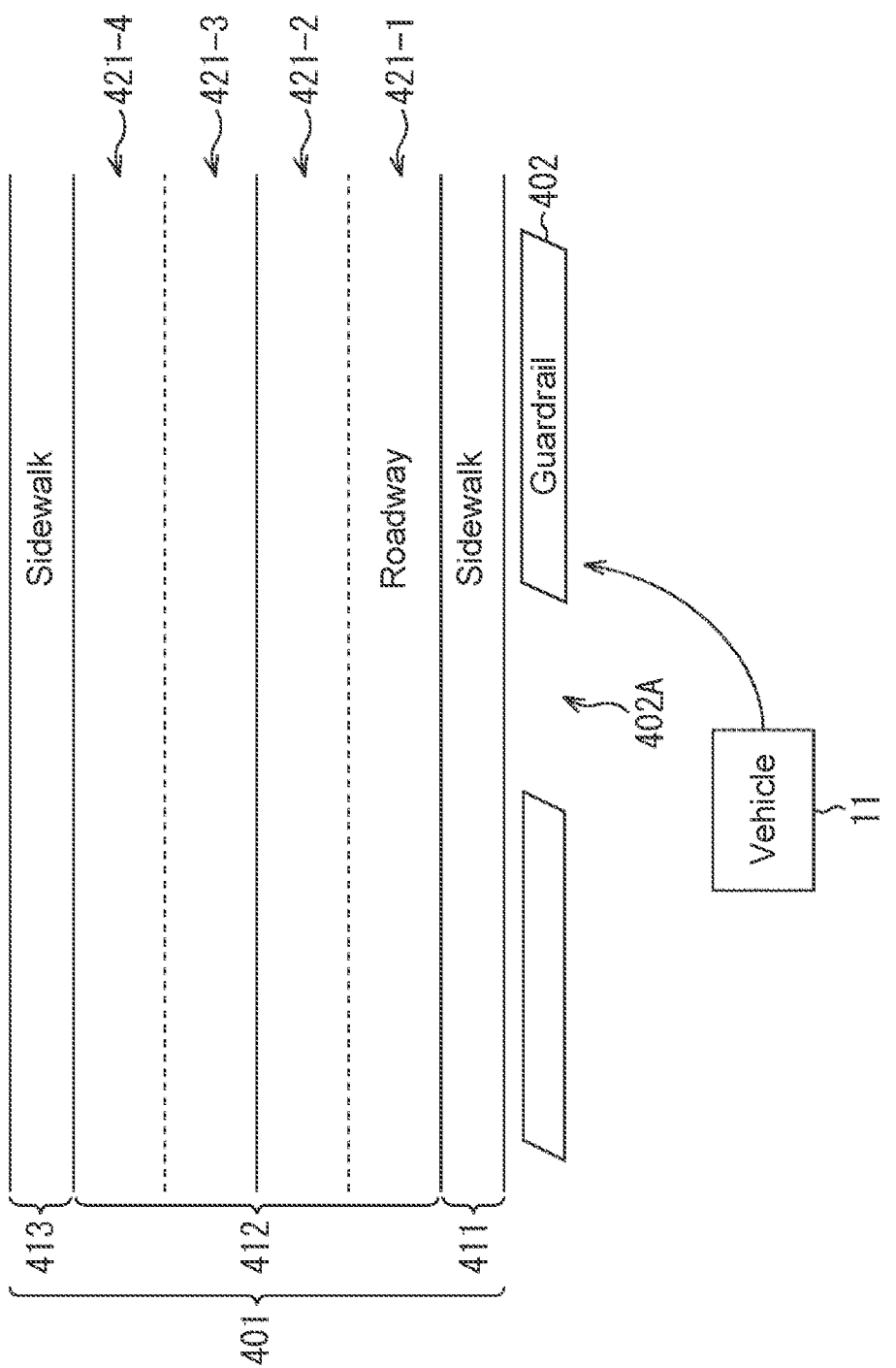
FIG. 16 is a diagram showing a configuration example of a road provided with a guardrail.

In addition, when an obstacle such as guardrail exists before a road as shown in, for example, FIG. 16, the driver may be guided to enter the road while avoiding the obstacle.

A road 401 in FIG. 16 is constituted by a sidewalk 411, a roadway 412, and a sidewalk 413 in order from a side closer to the vehicle 11. The roadway 412 is composed of the four lanes of lanes 421-1 to 421-4. Further, a guardrail 402 is provided on the outer side of the sidewalk 411, and the vehicle 11 is required to enter the road 401 from a gap 402A of the guardrail 402.

In this case, the object detection unit 172 detects, for example, the position of the guardrail 402 or the like. Based on the position and the posture of the vehicle 11 and the position of the guardrail 402, the steering control unit 113 determines whether the vehicle 11 is allowed to enter the road 401 from the gap 402A without contacting the guardrail 402 when the driver fully turns a steering wheel. Then, when it is determined that the vehicle 11 contacts the guardrail 402, the alert notification control unit 112 controls the display unit 24 or the voice output unit 25 to issue an alert to the driver or show guidance for supporting driving. After that, when the vehicle 11 is put in a state of being capable of entering the road 401 from the gap 402A without contacting the guardrail 402, the alert notification control unit 112 controls the display unit 24 or the voice output unit 25 to notify the driver of the fact that the vehicle 11 is allowed to enter the road 401.

The above description shows an example of a case in which the vehicle 11 enters and merges with a road from the outside of the road. However, the present technology can also be applied to a case in which the vehicle 11 turns to the left or the right while traveling on a road and merges with another road crossing the road.

Figure 17:
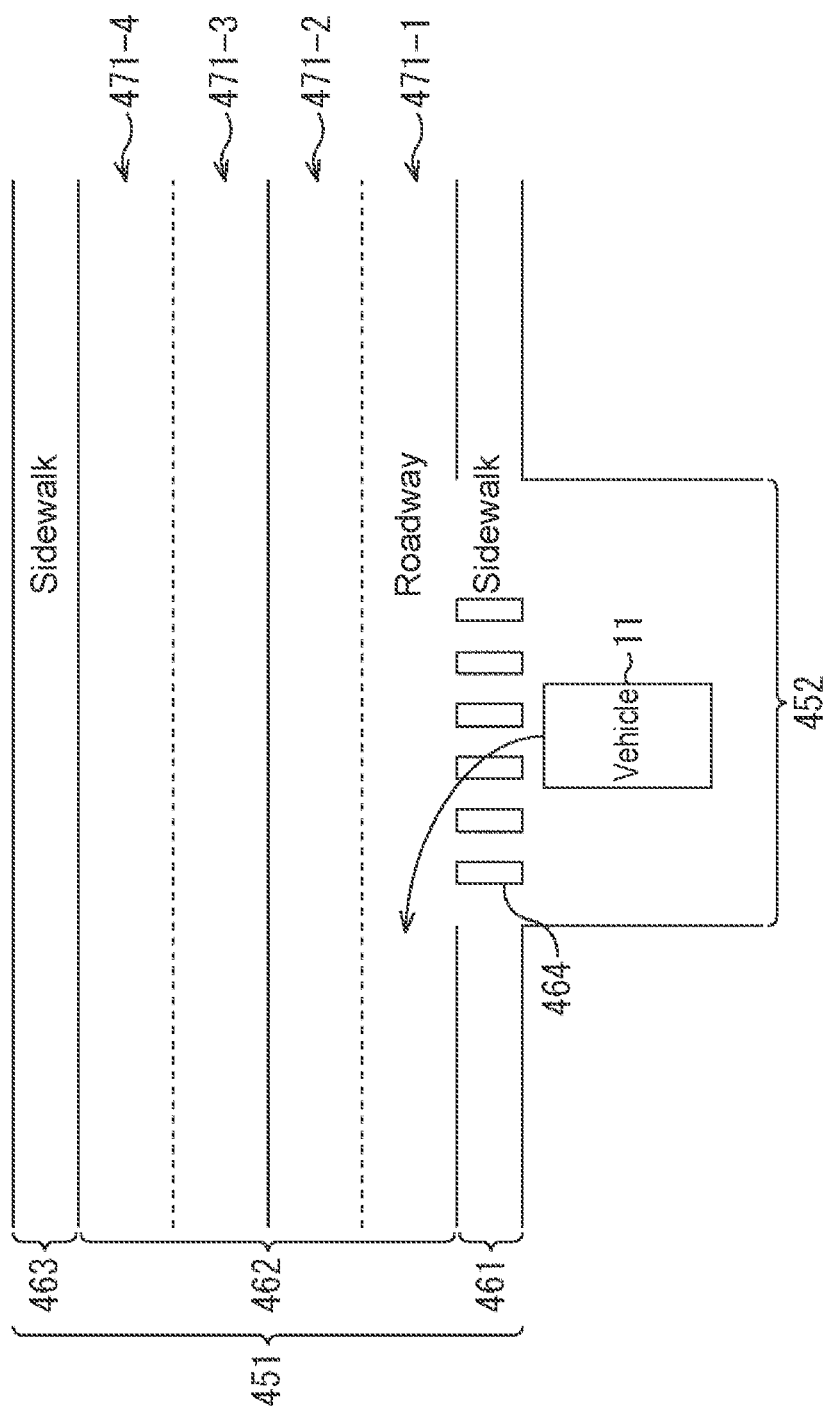
FIG. 17 is a diagram for describing driving support processing performed when a vehicle enters an intersection.

In the example of FIG. 17, the vehicle 11 is in a state of traveling on a road 452. Further, a road 451 perpendicularly crosses the road 452 in front of the vehicle 11. The road 451 is constituted by a sidewalk 461, a roadway 462, and a sidewalk 463 in order from a side closer to the vehicle 11. The roadway 462 is composed of the four lanes of lanes 471-1 to 471-4. In an area in which the road 451 and the road 452 are connected to each other, a crosswalk 464 is displayed on the sidewalk 461.

In this case as well, the driving of the vehicle 11 can be supported by the processing described above with reference to FIGS. 10 and 11. That is, the same processing as the processing performed before the vehicle 11 enters the sidewalk 211 in FIG. 11 or 12 is only required to be performed before the vehicle 11 enters the crosswalk 464 (the sidewalk 461), and the same processing as the processing performed before the vehicle 11 enters the roadway 212 in FIG. 11 or 12 is only required to be performed before the vehicle 11 enters the roadway 461.

In addition, the presence or absence of the indication of an alert, guidance, or the like or the content thereof may be changed according to the driving skills of the driver. For example, guidance for merging with a merging lane may be shown only to a driver with low driving skills but may not be shown to another driver.

Note that the driving skills of the driver may be learned by the learning unit 116 as described above or may be set by the driver himself/herself. Alternatively, for example, data on the records of the driving operations of the driver or the like may be provided from the vehicle 11 to a server (not shown) so that the driving skills of the driver are learned by the server. In addition, driver's information registered in advance and an image captured by a driver recognition camera may be compared with each other using the driver recognition camera installed in a vehicle to set the driving skills of the driver.

Further, for example, the object detection unit 172 may detect a person in charge who controls traffic based on the movement of an arm or the like. Then, when the person in charge is detected, the above driving support processing is stopped, and the object detection unit 172 recognizes a gesture made by the person in charge. Thus, the vehicle control unit 121 may control the traveling of the vehicle 11 according to an instruction by the recognized gesture. For the recognition of the gesture, various sensors or a front camera can be used but a TOF sensor is most desirably used.

In addition, for example, the learning unit 173 of the front camera ECU 22 may perform learning processing to determine whether each pedestrian or the like stops to make way for the vehicle 11 based on the way of walking, a facial expression, a visual line direction, or the like. Further, for example, upon detecting a pedestrian or the like approaching in a direction toward the vehicle 11 when the vehicle 11 enters a sidewalk, the object detection unit 172 may determine whether the pedestrian or the like stops based on a learning result. Then, when it is determined that the pedestrian or the like stops, the vehicle control unit 121 may, for example, cause the vehicle 11 to enter the sidewalk without prohibiting the vehicle 11 from entering the sidewalk. Further, on this occasion, the alert notification control unit 112 may, for example, perform the honking of a horn or the like to give any sign to the pedestrian. In addition, the alert notification control unit 112 may notify the driver of the fact that the detected pedestrian or the like is assumed to stop, or the like.

2-3. Other Modified Examples

For example, the learning unit 173 may perform learning processing (for example, learning processing to discriminate between a roadway and a sidewalk) to detect the configuration of a road. Then, the object detection unit 172 may detect the configuration of a merging road based on a learning result. Thus, it becomes possible to accurately detect, for example, a road in which the boundary between a sidewalk and a roadway is not easily found or a sidewalk through which a pedestrian or the like substantially passes in a roadway in which no sidewalk under law is provided.

Note that the above learning processing is not necessarily performed by the vehicle 11 alone. For example, respective vehicles may supply data to a server (not shown) so that the server performs the learning processing, and then the server may supply a learning result to the respective vehicles. Thus, the learning processing can be performed based on much data items, and accuracy in detecting the configuration of a road can be improved.

2-4. Applied Examples

The present technology can be applied to various vehicles regardless of the power sources or the energy supply sources of the vehicles. The present technology can be applied to, for example, gasoline vehicles, hybrid vehicles, plug-in hybrid vehicles, electric vehicles, fuel-cell vehicles, or the like. Further, the present technology can be applied not only to general vehicles but also to various vehicles such as buses, trucks, and motorcycles that travel on roadways.

Further, the present technology can also be applied to vehicles (hereinafter called automatic-driving vehicles) that perform self-driving. That is, with the application of the above technology, the automatic-driving vehicles can also avoid colliding with or contacting obstacles and merge with merging lanes at an appropriate timing. Note that although the control of starting or braking the vehicles is automatically performed when the above technology is applied to the automatic-driving vehicles, the braking of the vehicles may be preferentially controlled by the operation of drivers.

Note that when the present technology is applied to the automatic-driving vehicles, an occupant may perform the pressing of a button for starting automatic-driving or the like according to guidance by the alert notification control unit 112 or the like to control a timing for starting the automatic-driving vehicles or the like.

3. Other

3-1. Configuration Example of Computer

The above series of processing can be performed not only by hardware but also by software. When the series of processing is performed by software, a program constituting the software is installed in a computer. Here, examples of the computer include a computer incorporated in dedicated hardware and a general-purpose personal computer capable of performing various functions with the installation of various programs.

Figure 18:
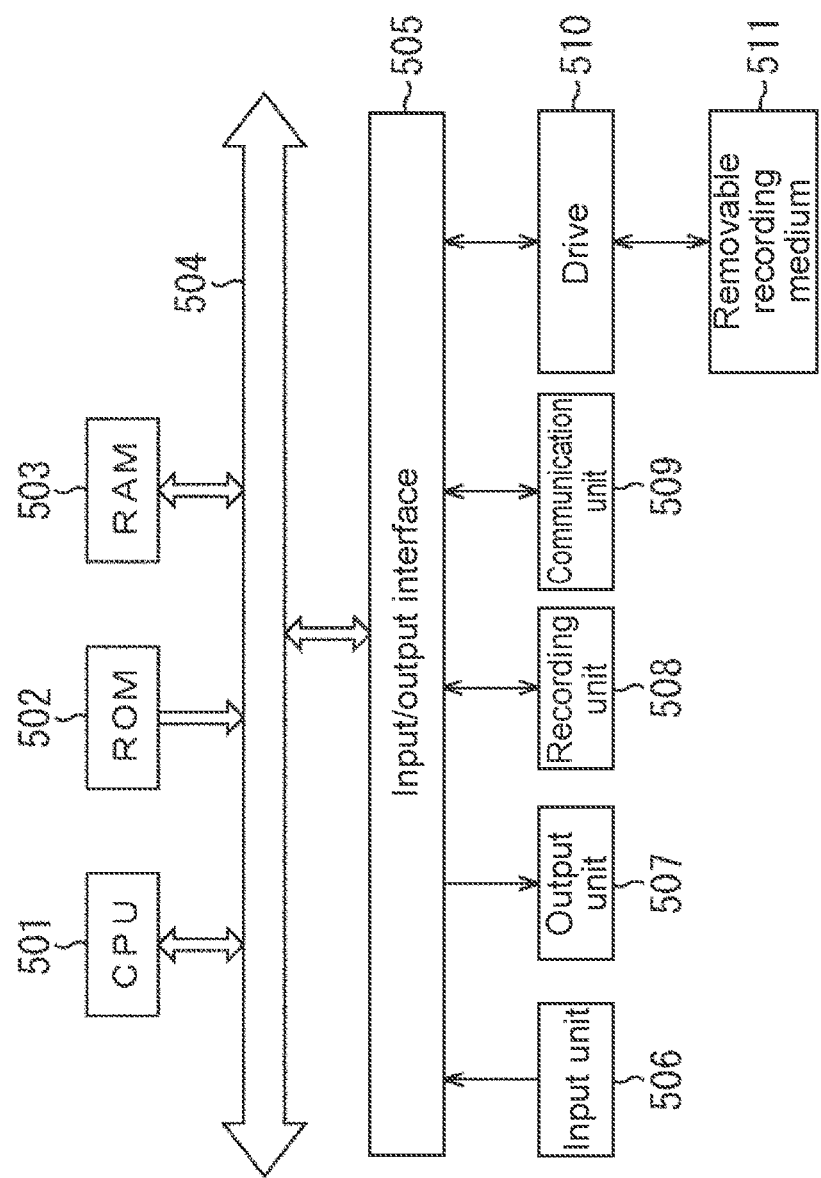
FIG. 18 is a diagram showing a configuration example of a computer.

FIG. 18 is a block diagram showing a configuration example of the hardware of a computer that performs the above series of processing according to a program.

In the computer, a CPU (Central Processing Unit) 501, a ROM (Read Only Memory) 502, and a RAM (Random Access Memory) 503 are connected to one another via a bus 504.

In addition, an input/output interface 505 is connected to the bus 504. An input unit 506, an output unit 507, a recording unit 508, a communication unit 509 (alternatively addressed as the communication unit 26 of FIG. 1), and a drive 510 are connected to the input/output interface 505.

The input unit 506 is composed of an input switch, a button, a microphone, an imaging element, or the like. The output unit 507 is composed of a display, a speaker, or the like. The recording unit 508 is composed of a hard disk, a non-volatile memory, or the like. The communication unit 509 is composed of a network interface or the like. The drive 510 drives a removable recording medium 511 such as a magnetic disk, an optical disk, a magnetic optical disk, and a semiconductor memory.

In the computer configured as described above, the CPU 501 loads, for example, a program recorded on the recording unit 508 into the RAM 503 via the input/output interface 505 and the bus 504 to be performed, whereby the above series of processing is performed.

The program performed by the computer (the CPU 501) can be recorded on, for example, the removable recording medium 511 serving as a package medium or the like to be provided. Further, the program can be provided via a wired or wireless transmission medium such as a local area network, the Internet, and digital satellite broadcasting.

In the computer, the program can be installed in the recording unit 508 via the input/output interface 505 by the attachment of the removable recording medium 511 to the drive 510. Further, the program can be received by the communication unit 509 via a wired or wireless transmission medium and installed in the recording unit 508. Besides, the program can be installed in advance in the ROM 502 or the recording unit 508.

Note that the program performed by the computer may be a program that is chronologically processed in order described in the present specification, or may be a program that is processed in parallel or at an appropriate timing such as when invoked. Further, a plurality of computers may perform the above processing in cooperation with each other. A computer system is constituted by a single or a plurality of computers that perform the above processing.

Note that in the present specification, a system represents the aggregate of a plurality of constituents (such as apparatuses and modules (components)), and all the constituents may not be necessarily accommodated in the same housing. Accordingly, both a plurality of apparatuses accommodated in separate housings and connected to each other via a network and one apparatus in which a plurality of modules are accommodated in one housing are systems.

Further, the embodiment of the present technology is not limited to the above embodiment but may be modified in various ways without departing from the spirit of the present technology.

For example, the present technology can employ the configuration of cloud computing in which one function is shared and cooperatively processed between a plurality of apparatuses via a network.

In addition, the respective steps described in the above flowchart can be performed not only by one apparatus but also by a plurality of apparatus in a shared fashion.

Further, when one step includes a plurality of processing, the plurality of processing included in the one step can be performed not only by one apparatus but also by a plurality of apparatuses in a shared fashion.

3-2. Example of Combining Configurations Together

The present technology can also employ the following configurations.

(1) An imaging device including:

an imaging unit that captures an image of a front of a vehicle; and an object detection unit that performs object detection processing on the basis of the image captured by the imaging unit, wherein the object detection unit changes an object detection method on the basis of a positional relationship between the vehicle and a road where the vehicle enters from an outside.

[2] The imaging device according to (1), wherein the object detection unit changes at least one of a preferential detection range in which an object is preferentially detected or a preferential detection target that is preferentially detected on the basis of the positional relationship between the vehicle and the road.

(3) The imaging device according to (2), wherein the object detection unit performs at least one of detection processing in which the roadway is detected as the preferential detection range or detection processing in which another vehicle is detected as the preferential detection target before the vehicle enters a roadway inside the road.

(4) The imaging device according to (3), wherein, when the vehicle merges with a first lane inside the roadway, the object detection unit preferentially performs detection processing to detect another vehicle approaching a position at which the vehicle merges in the first lane before the vehicle enters the roadway.

(5) The imaging device according to (4), wherein, when the vehicle crosses a second lane inside the roadway before merging with the first lane, the object detection unit further preferentially performs detection processing to detect another vehicle approaching a position at which the vehicle crosses in the second lane before the vehicle enters the roadway.

(6) The imaging device according to any of (3) to (5), wherein the object detection unit preferentially performs detection processing to detect a situation of a merging destination at which the vehicle merges with the roadway when no obstacle is detected on the roadway.

(7) The imaging device according to any of (2) to (6), wherein the object detection unit performs at least one of detection processing in which a sidewalk is detected as the preferential detection range or detection processing in which a pedestrian is detected as the preferential detection target before the vehicle enters the sidewalk inside the road.

(8) The imaging device according to any of (1) to (7), wherein the imaging unit includes a plurality of cameras each having a different imaging range, and the object detection unit switches between the cameras preferentially used for the object detection processing on the basis of the positional relationship between the vehicle and the road.

(9) The imaging device according to any of (1) to (8), wherein the object detection unit changes the object detection method on the basis of a distance between the vehicle and the road.

(10) A signal processing device including an object detection unit that performs object detection processing on the basis of an image obtained by capturing a front of a vehicle, wherein the object detection unit changes an object detection method on the basis of a positional relationship between the vehicle and a road where the vehicle enters from an outside.

(11) A vehicle control system including:

an imaging unit that captures an image of a front of a vehicle;

an object detection unit that performs object detection processing on the basis of the image captured by the imaging unit; and a vehicle control unit that controls the vehicle on the basis of an object detection result of the object detection unit, wherein the object detection unit changes an object detection method on the basis of a positional relationship between the vehicle and a road where the vehicle enters from an outside.

(12) The vehicle control system according to (11), wherein the object detection unit changes at least one of a preferential detection range in which an object is preferentially detected or a preferential detection target that is preferentially detected on the basis of the positional relationship between the vehicle and the road.

(13) The vehicle control system according to (12), wherein the object detection unit performs at least one of detection processing in which the roadway is detected as the preferential detection range or detection processing in which another vehicle is detected as the preferential detection target before the vehicle enters a roadway inside the road, and the vehicle control unit controls the vehicle to perform at least one of prohibition of entrance of the vehicle into the roadway or issuance of an alert to a driver when an obstacle is detected on the roadway.

(14) The vehicle control system according to (13), wherein the vehicle control unit controls the vehicle to show guidance for causing the vehicle to merge with the roadway when no obstacle is detected on the roadway.

(15) The vehicle control system according to (14), wherein the vehicle control unit changes content of the guidance on the basis of a driving skill of the driver.

(16) The vehicle control system according to any of (13) to (15), wherein the object detection unit preferentially performs detection processing to detect a situation of a merging destination at which the vehicle merges with the roadway when no obstacle is detected on the roadway, and the vehicle control unit controls the vehicle to perform at least one of control of traveling of the vehicle or the issuance of the alert to the driver on the basis of the situation of the merging destination.

(17) The vehicle control system according to any of (12) to (16), wherein the object detection unit performs at least one of detection processing in which a sidewalk is detected as the preferential detection range or detection processing in which a pedestrian is detected as the preferential detection target before the vehicle enters the sidewalk inside the road, and the vehicle control unit controls the vehicle to perform at least one of prohibition of entrance of the vehicle into the sidewalk or issuance of an alert to a driver when an obstacle is detected on the sidewalk.

(18) The vehicle control system according to any of (11) to (17), wherein the imaging unit includes a plurality of cameras each having a different imaging range, and the object detection unit switches between the cameras preferentially used for the object detection processing on the basis of the positional relationship between the vehicle and the road.

(19) The vehicle control system according to any of (11) to (18), further including a plurality of object detection sensors each having a different detection range, wherein the object detection unit further performs the object detection processing on the basis of sensor data from the plurality of object detection sensors, and switches between the object detection sensors preferentially used for the object detection processing on the basis of the positional relationship between the vehicle and the road.

(20) The vehicle control system according to any of (11) to (19), wherein the object detection unit changes the object detection method on the basis of a distance between the vehicle and the road.

REFERENCE SIGNS LIST 11 vehicle
21 front sensing camera
22 front camera ECU
23 positional information acquisition unit
24 display unit
25 voice output unit
27 steering mechanism
28 sensor unit
31 integrated ECU
34 braking device
35 engine
37 driving motor
51 driving control ECU
71 front camera module
81, 81-1 to 81-$n$ lens
82, 82-1 to 82-$n$ image sensor
101 image processing ECU
112 alert notification control unit
113 steering control unit
114 brake control unit
115 accelerator control unit
116 learning unit
121 vehicle control unit
171 image processing unit
172 object detection unit
173 learning unit

The invention claimed is:

1. An imaging device, comprising:
a plurality of cameras, wherein the plurality of cameras is configured to capture a plurality of images of an area of a front of a first vehicle; and
a processing unit configured to:
receive sensor data from a set of sensors, wherein the sensor data includes information associated with a distance between the front of the first vehicle and an object on a road;
perform an object detection process based on the sensor data and at least one image of the plurality of images, wherein
in the object detection process, the processing unit is further configured to:
set a preferential detection range in which the object is detected; and
set the object as a preferential detection target based on the distance between the front of the first vehicle and the object; and
control the set of sensors to change at least one of the preferential detection target or the preferential detection range, wherein
the set of sensors is controlled based on a positional relationship between the first vehicle and the road, and
the first vehicle enters from an outside of the road.

2. The imaging device according to claim 1, wherein the preferential detection range is a roadway and the preferential detection target is a second vehicle before the first vehicle enters the roadway inside the road.

3. The imaging device according to claim 2, wherein the processing unit is further configured to perform the object detection process to detect the second vehicle that approaches a position at which the first vehicle merges with a first lane in the roadway before the first vehicle enters the roadway.

4. The imaging device according to claim 3, wherein the processing unit is further configured to perform the object detection process to detect the second vehicle that approaches a position at which the first vehicle crosses a second lane in the roadway before merging with the first lane.

5. The imaging device according to claim 2, wherein the processing unit is further configured to perform the object detection process to detect a situation of a merge destination at which the first vehicle merges with the roadway based on absence of an obstacle on the roadway.

6. The imaging device according to claim 1, wherein the processing unit is further configured to perform the object detection process to detect at least one of a sidewalk as the preferential detection range or a pedestrian as the preferential detection target.

7. The imaging device according to claim 1, wherein
each camera of the plurality of cameras is associated with a different imaging range, and
the processing unit is further configured to switch between the plurality of cameras to perform the object detection process.

8. A signal processing device, comprising:
a processing unit configured to:
receive sensor data from a set of sensors, wherein the sensor data includes information associated with a distance between a front of a vehicle and an object on a road;
perform an object detection process based on the sensor data and at least one image of a plurality of images of an area of the front of the vehicle, wherein the plurality of images is captured by a plurality of cameras, wherein
in the object detection process, the processing unit is further configured to:
set a preferential detection range in which the object is detected; and
set the object as a preferential detection target based on the distance between the front of the vehicle and the object; and
control the set of sensors to change at least one of the preferential detection target or the preferential detection range, wherein
the set of sensors is controlled based on a positional relationship between the vehicle and the road, and
the vehicle enters from an outside of the road.

9. A vehicle control system, comprising:
a plurality of cameras, wherein the plurality of cameras is configured to capture a plurality of images of an area of a front of a first vehicle; and
a plurality of object detection sensors configured to generate sensor data that includes information associated with a distance between the front of the first vehicle and an object on a road; and
a processing unit configured to:
perform an object detection process based on the sensor data and at least one image of the plurality of images, wherein
in the object detection process, the processing unit is further configured to:
set a preferential detection range in which the object is detected; and
set the object as a preferential detection target based on the distance between the front of the first vehicle and the object;
control the first vehicle based on a result of the object detection process; and
control the plurality of object detection sensors to change the object detection process based on a positional relationship between the first vehicle and the road, wherein the first vehicle enters from an outside of the road.

10. The vehicle control system according to claim 9, wherein
the preferential detection range is a roadway and the preferential detection target is a second vehicle before the first vehicle enters the roadway inside the road, and
the processing unit is further configured to control the first vehicle to at least one of prohibit entrance of the first vehicle into the roadway or issue an alert to a driver when an obstacle is detected on the roadway.

11. The vehicle control system according to claim 10, wherein the processing unit is further configured to control the first vehicle to show guidance to merge the first vehicle with the roadway based on absence of the obstacle on the roadway.

12. The vehicle control system according to claim 11, wherein the processing unit is further configured to change content of the guidance based on a driving skill of the driver.

13. The vehicle control system according to claim 10, wherein the processing unit is further configured to:
perform the object detection process to detect a situation of a merge destination at which the first vehicle merges with the roadway based on absence of the obstacle on the roadway; and
control the first vehicle to perform at least one of control of travel of the first vehicle or the issuance of the alert to the driver, wherein the first vehicle is controlled based on the situation of the merge destination.

14. The vehicle control system according to claim 9, wherein the processing unit is further configured to:
perform the object detection process to detect at least one of a sidewalk as the preferential detection range or a pedestrian as the preferential detection target;
detect an obstacle on the sidewalk based on the object detection process; and
control the first vehicle to perform at least one of prohibition of entrance of the first vehicle into the sidewalk or issuance of an alert to a driver of the first vehicle based on the detected obstacle.

15. The vehicle control system according to claim 9, wherein
each camera of the plurality of cameras is associated with a different imaging range, and
the processing unit is further configured to switch between the plurality of cameras to perform the object detection process.

16. The vehicle control system according to claim 9, wherein
each object detection sensor of the plurality of object detection sensors is associated with a different detection range,
the processing unit is further configured to
switch between the plurality of object detection sensors based on the positional relationship between the first vehicle and the road.

* * * * *